United States Patent
Bhattacharya et al.

(10) Patent No.: US 12,444,051 B2
(45) Date of Patent: Oct. 14, 2025

(54) SYSTEM FOR OCT IMAGE TRANSLATION, OPHTHALMIC IMAGE DENOISING, AND NEURAL NETWORK THEREFOR

(71) Applicants: Carl Zeiss Meditec AG, Jena (DE); Carl Zeiss Meditec, Inc., Dublin, CA (US)

(72) Inventors: Arindam Bhattacharya, Dublin, CA (US); Warren Lewis, Yellow Springs, OH (US); Sophie Kubach, Menlo Park, CA (US); Lars Omlor, Pleasanton, CA (US); Mary Durbin, San Francisco, CA (US)

(73) Assignees: CARL ZEISS MEDITEC, INC., Dublin, CA (US); CARL ZEISS MEDITEC AG, Jena (DE)

( * ) Notice: Subject to any disclaimer, the term of this patent is extended or adjusted under 35 U.S.C. 154(b) by 740 days.

(21) Appl. No.: 17/428,122

(22) PCT Filed: Feb. 12, 2020

(86) PCT No.: PCT/EP2020/053515
§ 371 (c)(1),
(2) Date: Aug. 3, 2021

(87) PCT Pub. No.: WO2020/165196
PCT Pub. Date: Aug. 20, 2020

(65) Prior Publication Data
US 2022/0058803 A1 Feb. 24, 2022

Related U.S. Application Data

(60) Provisional application No. 62/805,835, filed on Feb. 14, 2019.

(51) Int. Cl.
*G06T 7/00* (2017.01)
*A61B 3/10* (2006.01)
(Continued)

(52) U.S. Cl.
CPC ............ *G06T 7/0014* (2013.01); *A61B 3/102* (2013.01); *G06T 5/50* (2013.01); *G06T 5/70* (2024.01);
(Continued)

(58) Field of Classification Search
CPC .......... G06T 7/0014; G06T 5/50; G06T 5/70; G06T 7/37; G06T 11/008;
(Continued)

(56) References Cited

U.S. PATENT DOCUMENTS 6,549,801 B1  4/2003  Chen et al.
6,741,359 B2  5/2004  Wei et al.
(Continued)

FOREIGN PATENT DOCUMENTS

EP    3404611 A1    11/2018
JP    2005525893    9/2005
(Continued)

OTHER PUBLICATIONS

C. Song, M. Ahn, D. Gweon and H. Cho, "High-resolution high-speed spectral domain optical coherence tomography," 2009 International Symposium on Optomechatronic Technologies, Istanbul, Turkey, 2009, pp. 11-15, doi: 10.1109/ISOT.2009.5326091. (Year: 2009).*

(Continued)

*Primary Examiner* — Charles T Shedrick
(74) *Attorney, Agent, or Firm* — SNELL & WILMER L.L.P.

(57) ABSTRACT

An OCT system includes a machine learning (ML) model trained to receive a single OCT scan/image and provide an image translation and/or denoise function. The ML model may be based on a neural network (NN) architecture including a series of encoding modules in a contracting path followed by a series of decoding modules in an expanding (Continued)

path leading to an output convolution module. An intermediate error module determines a deep error measure, e.g., between a training output image and at least one encoding module and/or decoding module, and an error from the output convolution module is combined with the deep error measure. The NN may be trained using true averaged images as ground truth, training outputs. Alternatively, the NN may be trained using randomly selected, individual OCT images/scans as training outputs.

27 Claims, 18 Drawing Sheets

(51) Int. Cl.
  *G06T 5/50*       (2006.01)
  *G06T 5/70*       (2024.01)
  *G06T 7/37*       (2017.01)
  *G06T 11/00*      (2006.01)
  *G16H 30/40*      (2018.01)

(52) U.S. Cl.
  CPC .............. *G06T 7/37* (2017.01); *G06T 11/008* (2013.01); *G16H 30/40* (2018.01); *G06T 2207/10084* (2013.01); *G06T 2207/10101* (2013.01); *G06T 2207/20081* (2013.01); *G06T 2207/20084* (2013.01); *G06T 2207/30041* (2013.01)

(58) Field of Classification Search
  CPC . G06T 2207/10084; G06T 2207/20081; G06T 2207/20084; G06T 2207/30041; G06T 5/60; G06T 2207/20021; G06T 2207/20216; A61B 3/102; G16H 30/40
  See application file for complete search history.

(56) References Cited

U.S. PATENT DOCUMENTS

| | | | |
|---|---|---|---|
| 7,301,644 | B2 | 11/2007 | Knighton et al. |
| 8,967,806 | B2 | 3/2015 | Bublitz et al. |
| 8,998,411 | B2 | 4/2015 | Tumlinson et al. |
| 9,332,902 | B2 | 5/2016 | Tumlinson et al. |
| 9,700,206 | B2 | 7/2017 | An et al. |
| 9,706,915 | B2 | 7/2017 | Everett et al. |
| 9,759,544 | B2 | 9/2017 | An et al. |
| 10,426,442 | B1* | 10/2019 | Schnorr .............. A61B 8/5223 |
| 11,763,549 | B1* | 9/2023 | Shu ........................ G06V 10/44 |
| 2005/0171438 | A1 | 8/2005 | Chen et al. |
| 2010/0027857 | A1 | 2/2010 | Wang |
| 2012/0277579 | A1 | 11/2012 | Sharma et al. |
| 2012/0307014 | A1 | 12/2012 | Wang |
| 2015/0208915 | A1* | 7/2015 | Schallek .............. A61B 3/1241 351/246 |
| 2016/0317027 | A1* | 11/2016 | Goto ...................... A61B 3/102 |
| 2017/0023887 | A1 | 1/2017 | Nakamura et al. |
| 2017/0256054 | A1* | 9/2017 | Matsumura .......... A61B 3/0025 |
| 2019/0005603 | A1 | 1/2019 | Chen et al. |
| 2019/0130217 | A1* | 5/2019 | Wu ........................... G06T 5/20 |
| 2020/0037872 | A1* | 2/2020 | Shiba ................. G01B 9/02044 |

FOREIGN PATENT DOCUMENTS

| | | |
|---|---|---|
| JP | 2008528954 | 9/2011 |
| WO | 2018200493 | 11/2018 |

OTHER PUBLICATIONS

M. K. S. Yadav and N. P. Singh, "A Survey on Optical Coherence Tomography," 2023 IEEE International Conference on Computer Vision and Machine Intelligence (CVMI), Gwalior, India, 2023, pp. 1-6, doi: 10.1109/CVMI59935.2023.10465056. (Year: 2023).*

Japan Patent Office; Japan Office Action dated Jan. 25, 2024 in Application No. 2021-547257.

Blazkiewicz et al., (2005). "Signal-to-noise ratio study of full-field Fourier-domain optical coherence tomography," Applied Optics, 44(36):7722-7729.

Devalla et al., (2018). "A Deep Learning Approach to Denoise Optical Coherence Tomography Images of the Optic Nerve Head," arXiv:1809.10589, 19 pages.

Halupka et al., (2018). "Retinal optical coherence tomography image enhancement via deep learning", Biomedical Optics Express, 9(12):6205-6221.

Hillmann et al., (2011). "Holoscopy—holographic optical coherence tomography," Optics Letters, 36(13):2390-2392.

International Search Report and Written Opinion received for International Patent Application No. PCT/EP2020/053515 mailed on Mar. 25, 2020, 15 pages.

Jin et al., (2017). "Deep Convolutional Neural Network for Inverse Problems in Imaging," IEEE Transactions On Image Processing, 26(9):4509-4522.

Lee et al., (2018). "Generating retinal flow maps from structural optical coherence tomography with artificial intelligence", bioRxiv, 25, 26 pages.

Ma et al., (2018). "Speckle noise reduction in optical coherence tomography images based on edge-sensitive cGAN", Biomedical Optics Express, 9(11):5129-5146.

Nakamura et al., (2007). "High-Speed three dimensional human retinal imaging by line field spectral domain optical coherence tomography," Optics Express, 15(12):7103-7116.

Xu et al., (2018). "Improving the Resolution of Retinal OCT with Deep Learning", MIUA2018, 046(v2):1-8.

Japan Patent Office; Japan Office Action dated May 24, 2024 in Application No. 2021-547257.

* cited by examiner

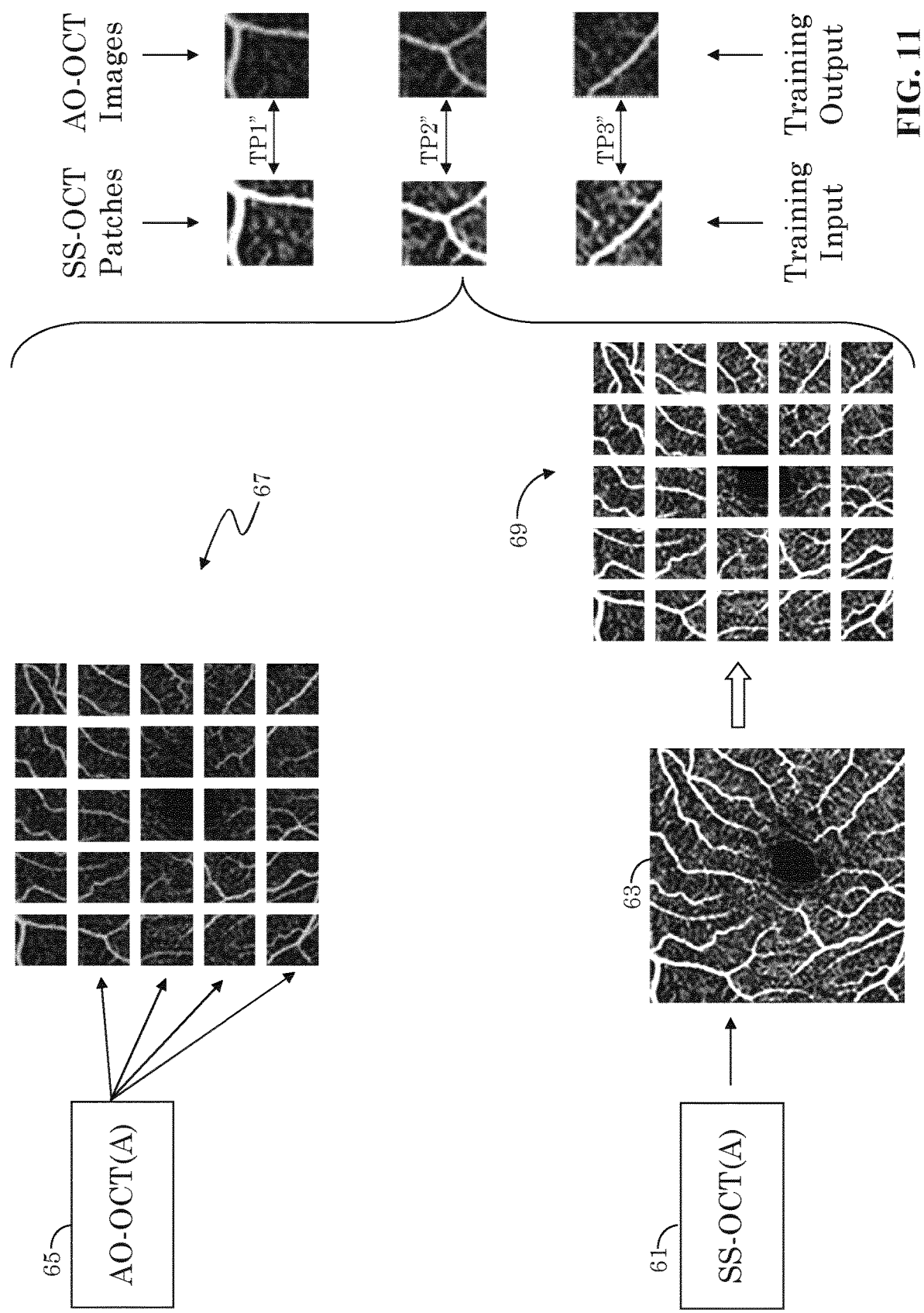

SYSTEM FOR OCT IMAGE TRANSLATION, OPHTHALMIC IMAGE DENOISING, AND NEURAL NETWORK THEREFOR

PRIORITY

This application is a National Phase application under 35 U.S.C. § 371 of International Application No. PCT/EP2020/053515, filed Feb. 12, 2020, which claims priority to U.S. Provisional Application Ser. No. 62/805,835, filed Feb. 14, 2019, the contents of which are hereby incorporated by reference in their entirety.

FIELD OF INVENTION

The present invention is generally directed to the field of optical coherence tomography (OCT). More specifically, it is directed toward improving the quality of OCT scans/images, and other ophthalmic images.

BACKGROUND

Early diagnosis is critical for the successful treatment of various eye diseases. Optical imaging is the preferred method for non-invasive examination of the retina. Although age-related macular degeneration, diabetic retinopathy and glaucoma are known to be the major causes of vision loss, diagnosis is often not made until after damage has manifested itself. This is primarily due to the relatively poor resolution of some retinal imaging techniques. Therefore, a goal of advanced sensitive and accurate ophthalmic imaging and diagnostic tools is to provide imaging modalities able to resolve/display (e.g., for detection and monitoring) pathological variations of retinal microstructures at a pre-clinical stage of disease.

One such advanced ophthalmic imaging and diagnostic tool is the optical coherence tomography (OCT) system. Depending upon the technology used, OCT may provide an axial resolution in the range of about 1 to 15 µm, and a lateral resolution in the range of a few microns to a few tens of microns. As it would be understood, achieving higher resolutions typically requires extensive research, cost, and complexity.

Attempts to achieve improved image quality through software solutions have had limited success. For example, the Hessian-based vesselness filter, known in the art, may provide improved vascular connectivity, but it has been found to introduce imaginary (e.g., fictitious) structures not found in the original (e.g., true) scan. Because the Hessian-based vesselness filter is not faithful to the true vascular structure of the original scan, its use in examining ophthalmic images for pathologies is limited.

It is an object of the present invention to provide an OCT system with improved resolution.

It is an object of the present invention to provide a system and method for improving the imaging capability of an existing OCT, or OCT angiography (OCTA), system with minimal hardware modification to the OCT or OCTA system.

It is a further object of the present invention to provide a system and method for enhancing the image quality of pre-existing OCT images.

SUMMARY OF INVENTION

The above objects are met in an optical coherence tomography (OCT) system having a light source for generating a beam of light; a beam splitter having a beam-splitting surface for directing a first portion of the light into a reference arm and a second portion of the light into a sample arm; optics for directing the light in the sample arm to one or more locations on a sample; a detector for receiving light returning from the sample and reference arms and generating signals in response thereto; a processor for converting the signals into a first image and submitting the first image to an image translation module that translates the first image to a second image characterized by one or more of decreased jitter and minimized creation of fictional structures as compared to the first image; and an output display for displaying an output image based on the second image. The image translation module preferably includes a machine learning module (e.g., a deep learning, neural network) trained using a set of training input images and a target set of training output images, where the training input images are generated independent of the training output images. For example, the training input are not based on training output images with added, known types of noise (e.g., Gaussian noise, Poisson noise, speckle noise, salt & pepper noise, etc.). Nonetheless, the training output images may be of higher image quality than the training input images so that the trained machine learning module (e.g., in operation) produces second images that are higher quality representations of the first images. For example, individual training output images may be constructed by averaging a set of training input images. Alternatively, the training input images and training output images may be generated by OCTs of different modalities, where an OCT modality capable of creating higher quality images is used to generate training output images, and an OCT modality that generates lower quality images is used to generate input training images. For instance, an adaptive optics OCT system may be used to generate the training output images, and one or more of a non-adaptive OCT system (e.g., a time domain OCT, frequency-domain (FD) OCT, spectral domain (SD) OCT, and/or swept source (SS) OCT) may be used to generate the training input image. In this manner, the translation module effectively converts OCT images of a first modality to images resembling those generated by an OCT of a second, different modality.

Typically, such an image translation module would require a large number of training samples (e.g. a larger number of training input image and training output images) for effective deep learning. This may not be a problem when taking images of nature scenes, for example, but it is problematic when attempting to gather a large library of ophthalmic images (particularly a large number of OCT images) for training a machine learning model. Creating a large library of ophthalmic images for deep learning can be economically prohibitive. The present invention provides a novel neural network (NN) architecture that provides deep learning results with a smaller library of training samples than typical. Additionally, the present neural network deviates from prior known image translation neural network architectures to define a compact form with fewer learning layers, or modules. The present NN is suitable for multiple imaging modalities, e.g., different types of ophthalmic images such as images from fundus imaging systems and OCT systems, but is herein illustratively described within the context of OCT images. Thus, the present NN may be recited as incorporated within an OCT system, but it is to be understood that the present NN architecture may also be incorporated into other types of ophthalmic imaging systems and may be applied to the processing of other types of ophthalmic images. For example, the present NN may be used to process, and improve the image quality of, an existing library of previously generated ophthalmic images (e.g., a memory store of preexisting OCT images or fundus images).

The known U-Net architecture is traditionally limited to image classification and image segmentation. The present NN architecture is based on the U-Net, but extends it functionality to image translation. Previously, a U-Net would be combined with another NN, such as an adversarial network (GAN) to implement image translation. In this prior art case, the U-Net would provide image segmentation, and the GAN would provide image translation. The present architecture, however, builds on the basic U-Net architecture so that it provides image translation directly without the need for a GAN, or any other secondary NN, to achieve image translation. The present NN architecture may include: an input module for receiving a first image (e.g., an input OCT or Fundus image); a contracting path following the input module, where the contracting path includes multiple of encoding modules with each encoding module having a convolution stage (e.g., one or more convolution layers), an activation function, and a max pooling operation; an expanding path following the contracting path, where the expanding path includes multiple decoding modules (e.g., one or more decoding layers) with each decoding module concatenating its current value with that of a corresponding encoding module; an output convolution module excluding a pooling layer and excluding an activation function, where the output convolution module receives the output from the last decoding module in the expanding path. In a traditional U-Net, each decoding module in the expanding path would include an activation function (e.g., a sigmoid) layer. In the present invention, however, one or more, and preferably all, decoding modules in the expanding path do not have any activation layer. This lack of activation layer(s) in the decoding module(s) aids the present architecture to achieve image translation functionality. In a traditional neural network, the output from the output convolution module would typically be compared with a target training output image to determine a loss error, and this loss error would be fed back through the NN (e.g., in a back-propagation process) to adjust the NN's weights and biases so as to produce an output with smaller error in a subsequent training cycle. The present invention deviates from this practice. The present NN further includes at least one intermediate error module that determines an error measure for at least one encoding module and/or one decoding module. This intermediate error module takes the current results of its at least one encoding module and/or one decoding module, upscale the current results to the resolution of a current training output image, and compares it with the current training output image to define one or more deep error measures. The additional deep error measures are then combined with the loss error from the output convolution module to define a total loss error for the system that can then be fed back through the NN to adjust its internal weights and biases. These multiple sources of error may be combined, for example, by direct addition, by a weighted combination, and/or by averaging. By introducing the training output image into various internal stages of the NN, the NN is prevented from deviating too far off the target output and thereby also assists in achieving images translation.

The present NN may be used for additional purposes, such reduction of noise artifacts in ophthalmic images. It is to be understood, however, that other NN architectures may likewise be used to implement some of the present image translation and noise reduction functionalities.

The above objects are further met in an ophthalmic imaging system or method (e.g., a fundus imaging system or OCT system) for reducing noise artifacts in an ophthalmic image, or for generating ophthalmic images of reduced noise artifacts. The system or method may include using a processor for acquiring a first ophthalmic image, submitting the first ophthalmic image to an image modification module that creates a second ophthalmic image based on the first image and having reduced noise artifacts as compared with the first ophthalmic image; and displaying on an electronic display an output image based on the second image. Preferably, the image modification module includes a neural network whose training includes: collecting multiple test ophthalmic images of at least one sample (e.g., an eye), the collected test ophthalmic images being noisy images; randomly selecting one of the test ophthalmic images as a training output image; randomly selecting one or more of the remaining test ophthalmic images as a training set of training input images; and separately and individually submitting each training input image to the neural network and providing the training output image as a target output for the neural network.

Other objects and attainments together with a fuller understanding of the invention will become apparent and appreciated by referring to the following description and claims taken in conjunction with the accompanying drawings.

The embodiments disclosed herein are only examples, and the scope of this disclosure is not limited to them. Any embodiment feature mentioned in one claim category, e.g. system, can be claimed in another claim category, e.g. method, as well. The dependencies or references back in the attached claims are chosen for formal reasons only. However, any subject matter resulting from a deliberate reference back to any previous claims can be claimed as well, so that any combination of claims and the features thereof are disclosed and can be claimed regardless of the dependencies chosen in the attached claims.

BRIEF DESCRIPTION OF THE DRAWINGS

In the drawings wherein like reference symbols/characters refer to like parts:

FIG. 11 illustrates the use of a set of individual AO-OCT images produced by an AO-OCT system to train a neural network in accord with the present invention.

DESCRIPTION OF THE PREFERRED EMBODIMENTS

Figure 1:
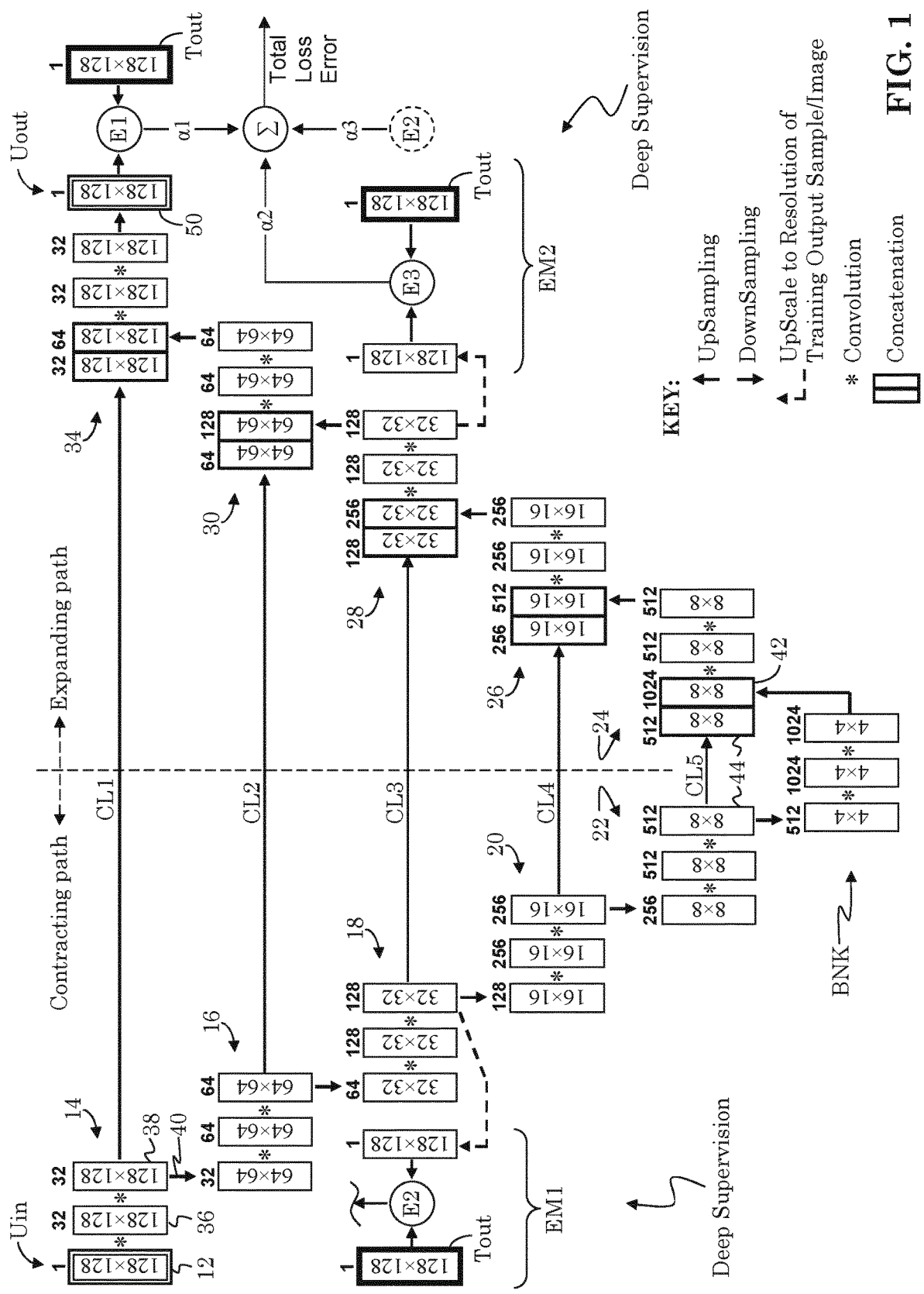
FIG. 1 illustrates a neural network architecture in accord with the present invention.

There are several different types of ophthalmic images. For example, ophthalmic images may be created by fundus photography, fluorescein angiography (FA), fundus autofluorescence (FAF), optical coherence tomography (OCT), OCT angiography (OCTA), ocular ultrasonography. Each provides different information (or information gathered in a different manner) of an eye, and each may emphasize a different aspect of the eye. Ophthalmic images, in general, are an integral part of diagnosing a particular eye-related malady, and their effectiveness is dependent upon their ability to produce good quality images, e.g., images with sufficient resolution, focus, magnification, and signal-to-noise ratio (SNR). Examples of fundus imagers are provided in U.S. Pat. Nos. 8,967,806 and 8,998,411, examples of OCT systems are provided in U.S. Pat. Nos. 6,741,359 and 9,706,915, and examples of an OCTA imaging system may be found in U.S. Pat. Nos. 9,700,206 and 9,759,544, all of which are herein incorporated in their entirety by reference. The present invention seeks to use machine learning (ML) techniques (e.g. decision tree learning, support vector machines, artificial neural networks (ANN), deep learning, etc.) to provide an ophthalmic image-translation tool and/or a denoising tool that improves the quality of an ophthalmic image produced by any of a select type of imaging systems. The following exemplary embodiments describe the invention as applied to OCT systems, but it is to be understood that the present invention may also be applied to other ophthalmic imaging modalities, such as fundus imaging.

Furthermore, the present invention provides for translating OCT images of a first OCT modality into images of a second OCT modality. In particular, there are different types of OCT/OCTA imaging modalities, such as time domain (TD) OCT/OCTA and Frequency-domain (FD) OCT/OCTA. Other more specific OCT modalities may include Spectral Domain (SD) OCT/OCTA, Swept Source (SS) OCT/OCTA, Adaptive optics (AO) OCT/OCTA, etc., and each has its advantages and disadvantages. For example, AO-OCT generally provides better image quality and higher resolution than more conventional OCT systems, but is much more complicated, requires expensive components, and generally provides a much-reduced field-of-view (FOV) than conventional OCT systems. The present invention provides an OCT system of a first modality that may selectively produce OCT images that are translated into (e.g., mimic, simulate, or resemble) those of another, different modality. For example, an SD-OCT may be made to provide images that resemble those provided by an SS-OCT or an AO-OCT. Alternatively, the present invention may provide an OCT system that translates a single captured OCT image of a given sample region of an eye into an image that resembles that produce by an averaging of multiple OCT images of the same sample region without the need for repeated scanning of the same sample region.

Additionally, the present invention provides an improved method/tool for reducing noise (e.g., denoising) in an ophthalmic image, e.g., an OCT image. The present denoising tool may be applied separately, or in addition to, the image-translation tool. That is, the present denoising tool may be applied independent of, or in combination with, the present image-translation tool. Furthermore, the present denoising technique may optionally be combined with the training of the present image translation tool.

The present ophthalmic image enhancement tool(s) may be incorporated into an ophthalmic imaging device such as a fundus imager or OCT system, or may be provided as a network-accessible service. For example, the image enhancement tool(s) may be implemented as an application executable on a mobile device, such as computing tablet or smart phone, that accesses a remote host over the Internet, and the remote host provides the present invention as an ophthalmic image enhancing service. In this manner, higher computing requirements may be offloaded from the mobile device (or OCT system) onto the remote host. Alternatively, the ophthalmic image enhancement tool may be provided entirely on the Internet as a website accessible over the Internet by use of a web browser. In this manner a physician or technician may make use of the present ophthalmic image enhancement tool from anywhere using any device having Internet access and capable of running a web browser.

For illustration purposes, various imaging systems, including OCT and AO-OCT systems, are described below with reference to FIGS. 22-24.

The following embodiments describe a system and method for providing an OCT/OCTA system capable of converting an OCT/OCTA image of first modality into another (preferably higher quality and/or higher resolution) OCT image of a second modality. For example, the converted image may have characteristics of an image created by averaging multiple OCT/OCTA images (hereinafter termed an average-simulating image) and/or an image created by AO-OCT system (hereinafter termed an AO-simulating image) without the difficulties associated with the generation of true averaged OCT/OCTA images or true AO-OCT/OCTA images. Alternatively, or in addition to the image translation capability, the present system may further provide a noise reduction utility. In some embodiments, these added capabilities are provided by a data processing module based on machine learning. Various types of machine learning techniques are envisioned by the present invention (e.g. nearest neighbor, naive Bayes, decision tree learning, support vector machines, artificial neural networks (ANN), deep learning, etc.), but a currently preferred implementation is based on neural networks (NN), and in particular is based on a new NN architecture that builds on a U-Net architecture and provides for simplified training, a reduced number of network levels, and a smaller training set than typical.

Various neural network architectures, such as the multi-layer perceptron (MLP) neural network, convolutional neural network (CNN), and U-Net, are discussed below with reference to FIGS. 25-28. Optionally, the present invention may be implemented using any one, or a combination, of these neural networks, but a preferred embodiment may use a specialized image-translation neural network architecture based on the U-Net architecture to implement an image translation function and/or a denoising function.

A typical neural network (NN) may have multiple hidden layers and be made up of neurons having learnable weights and biases, where each neuron may receive inputs, perform an operation and be optionally followed by a non-linearity (e.g., an activation function). Typically, a deep learning NN requires a large training set and is not well suited to manipulate images larger than a few pixels. A convolutional neural network (CNN) is similar to a (deep learning) neural network (NN), but the CNN may be optimized to work with images more efficiently. The CNN assumes that data close together is more related than data far apart, which permits making forward functions more efficient and reducing the number of parameters. CNNs, however, may still require a large training set. As it would be understood by one versed in the art, obtaining a larger number of relevant medical images (particularly ophthalmic images) to compile a large training set can be problematic for various economic and regulatory reasons. The U-Net neural network architecture may use a smaller training set than a traditional NN, and like a CNN, the U-Net may also be optimized for training on images. The primary use of the U-Net has traditionally been for image segmentation (e.g., identifying the shape of foreground objects in an image) as a pre-processing step for further image processing. For example, a U-Net may be coupled as a preprocessing step to an adversarial network (GAN) to implement image translation. In this case, the GAN would receive segmentation information output from U-Net, and the GAN would apply image translation to the segmented items. The present invention provides an architecture based on the U-Net that eliminates the need for a GAN, such that instead of (or in addition to) providing image segmentation, the present U-Net-based architecture provides image translation, directly.

Figure 27:
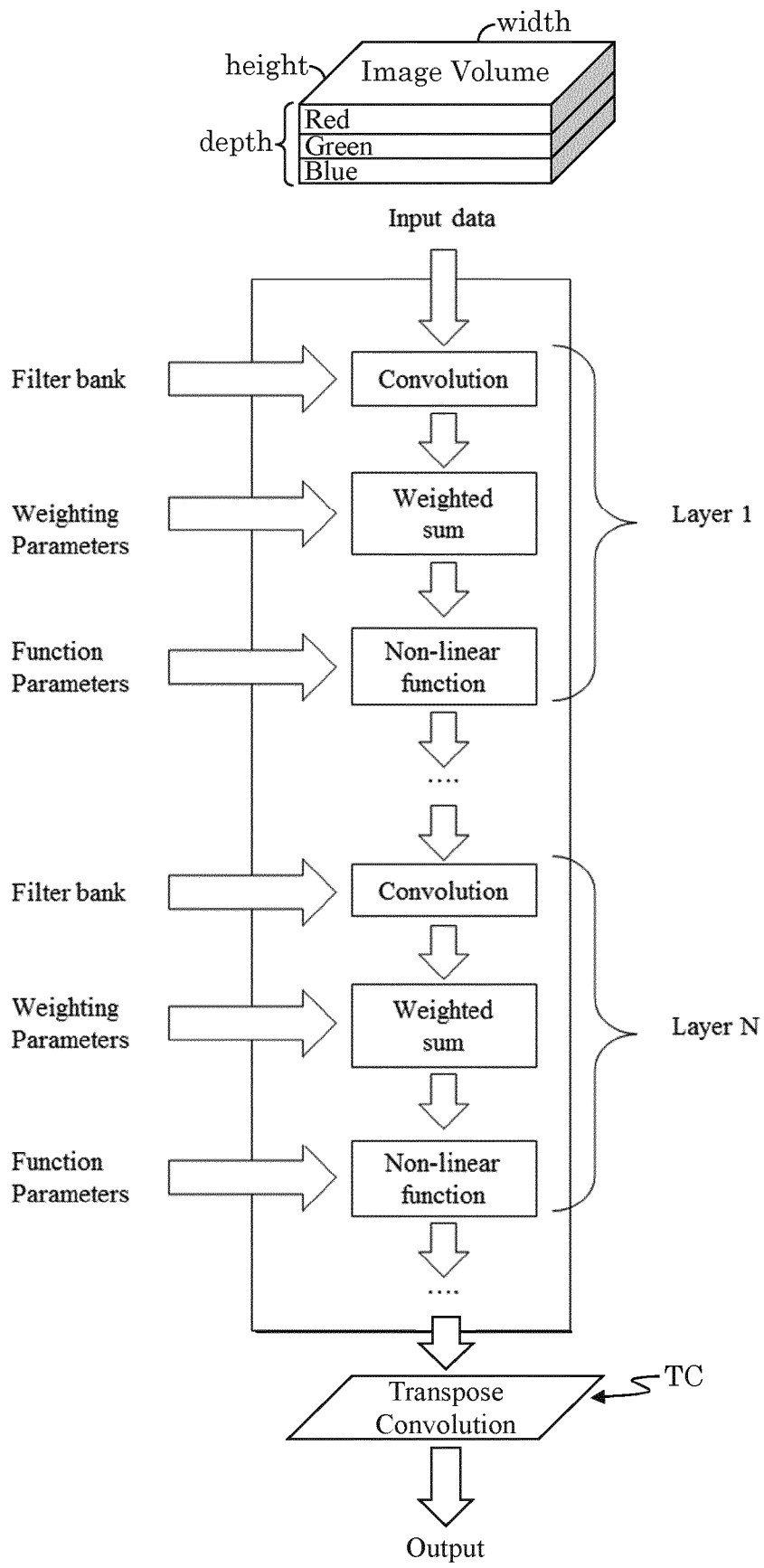
FIG. 27 illustrates an example convolutional neural network architecture.

With reference to FIG. 1, the present architecture builds on the typical U-Net architecture (e.g., see for example, FIG. 28) and includes an input module (or input layer or input stage) 12 that receives an input Uin (e.g., input image or image patch) of any given size (e.g., 128 by 128 pixels in size). For illustration purposes, the image size at any stage, or layer, is indicated within a box that represents the image, e.g., box 12 encloses number "128×128" to indicate that input image Uin is comprised of 128 by 128 pixels. The input image may be an OCT/OCTA en face or B-scan image. It is to be understood, however, that the input may be of any size and dimension. For example, the input image may be an RGB color image, as illustrated in FIG. 27. The input image undergoes a series of processing layers, each of which is illustrated with exemplary sizes, but these sizes are for illustration purposes only and would depend upon multiple factors, such as the size of the image, convolution filter, pooling stages, etc. The present architecture includes a contracting path (herein exemplarily comprised of five encoding modules 14, 16, 18, 20, and 22) followed by an expanding path (similarly comprised of five corresponding decoding modules 24, 26, 28, 30, and 34), and five copy-and-crop links (e.g., skip connections) CL1 to CL5 between corresponding modules/stages that copy the output of one encoding module in the contracting path and concatenates it to (e.g., appends it to the back of) the up-converted input of a correspond decoding module in the expanding path. The contracting path is similar to an encoder, and generally captures context (or feature) information by the use of feature maps. Each encoding module in the contracting path may include one or more convolutional layers, illustratively indicated by an asterisk symbol "*", which may be followed by a max pooling layer (e.g., embodied within a DownSampling layer). For example, input image, Uin, is illustratively shown to undergoes two convolution layers, each producing 32 feature maps. As it would be understood, each convolution kernel produces a feature map (e.g., the output from a convolution operation with a given kernel is an image typically termed a "feature map"). For example, input Uin undergoes a first convolution that applies 32 convolution kernels (not shown) to produce an output 36 consisting of 32 respective feature maps. However, as it is known in the art, the number of feature maps produced by a convolution operation may be adjusted (up or down). For example, the number of feature maps may be reduced by averaging groups of feature maps, dropping some feature maps, or other known method of feature map reduction. In the present case, the first convolution is followed by a second convolution whose output 38 is limited to 32 feature maps. Another way to envision feature maps may be to think of the output of a convolution layer as a 3D image whose 2D dimension is given by the listed X-Y planar pixel dimension (e.g., 128×128 pixels), and whose depth is given by the number of feature maps (e.g., 32 planar images deep). Following this analogy, the output 38 of encoding module 14 may be described as a 128×128×32 image. The output 38 from the second convolution then undergoes a pooling operation, which reduces the 2D dimension of each feature map (e.g., the X and Y dimensions may each be reduced by half). The pooling operation may be embodied within the DownSampling operation, as indicated by a downward arrow 40. Several pooling methods, such as max pooling, are known in the art and the specific pooling method is not critical to the present invention. The contracting path thus forms a convolutional network, herein shown with five encoding modules (or stages or layers) 14, 16, 18, 20, and 22. As is typical of convolutional networks (e.g., see FIGS. 27 and 28), each encoding module preferably provides at least one convolution stage, followed by an activation function (e.g., a rectified linear unit, ReLU or sigmoid layer), not shown, and a max pooling operation. Generally, an activation function introduces non-linearity into a layer (which helps avoid overfitting issues), receives the results of a layer, and determines whether to "activate" the output (e.g., determines whether the value of a given node meets a criteria to have an output forwarded to a next layer/node).

The expanding path is similar to a decoder, and among other things, may provide localization and spatial information for the results of the contracting path. The expanding path is herein shown to have five decoding modules, 24, 26, 28, 30, and 34, where each decoding module concatenates its current up-converted input with the output of a corresponding encoding module. For example, the up-converted input 42 of decoding module 24 is shown concatenated with the output 44 of corresponding encoding module 22. More specifically, output 44 (whose dimensions are 8×8×512) may be appended to up-converted input 42 (whose dimensions are 8×8×1024) to define a concatenated image whose dimensions are 8×8×1536. In this manner, the feature information (from encoding module 22) is combined with spatial information (from decoding module 24). This combining of feature and spatial information continues in the expanding path through a sequence of up-convolutions (e.g., UpSampling or transpose convolutions or deconvolutions) and concatenations with high-resolution features from the contracting path (e.g., via CL1 to CL5). The output of a deconvolution layer is concatenated with the corresponding (optionally cropped) feature map(s) from the contracting path, followed by two (or more) convolutional layers. Between the contracting path and the expanding path is typically a bottleneck module, BNK, which may consist of two, or more, convolutional layers.

The present architecture of FIG. 1 is based on the U-Net (see FIG. 28), but has some distinguishing features. Firstly, the expanding path in the present architecture may lack any activation function. That is, one or more, and preferably all, decoding modules 24, 26, 28, 30, and/or 34 in the expanding path may lack any activation layer, e.g., sigmoid layer. This lack of activation function(s) in the expanding path may aid the present architecture to achieve image translation functionality. Secondly, the present neural network incorporates a novel training architecture. As it is known in the art, a neural network may be trained by back-propagation wherein, during a training cycle, a current neural network output (e.g. Uout) is compared with a current training output image Tout to determine a current loss error E1. Typically, this loss error E1 would be fed back through the neural network to adjust its internal weights and biases so as to produce a better output with smaller error in a subsequent training cycle. The present architecture, however, incorporates deep supervision links to determine a deep error from any stage in the contracting path and/or the expanding path and combines this deep error with the loss error at the output module/layer 50 to define a total loss error for the system. The deep supervision may be in the form of an intermediate error module (e.g., EM1/EM2) that determines a deep error measure for at least one encoding module and/or at least one decoding module. Optionally, the selected encoding module(s) and decoding module(s) may be randomly selected, or may correspond to each other according to their corresponding copy-and-crop link(s). The current state of a selected encoding module(s) and/or decoding module(s) is compared with a current training output image to assure that the output does not deviate too much from the input. This results in faster convergence, and thus a shorter training time. For example, during training, the current output from encoding stage 18 may be up-converted to the resolution of the of the current training output image Tout, and compared with Tout to determine a deep error E2. Similarly, during training, the current output from the decoding stage 28 may be up-converted to the resolution of the of the current training output image Tout, and compared with Tout to determine a deep error E3. Deep errors E2 and E3 are then combined with the error E1, such as by a weighted linear combination. Optionally, the input Uin may be fed forward to (e.g., combined with) the output Uout prior to determining loss error E1. For example, input Uin may be added to output Uout (such as by use of a feedforward link from Uin to Uout, not shown) to define a combination network output, Uin+Uout, (or a weighted combination of both) prior to determining error loss E1. The combination network output, Uin+Uout, may take the place of Uout in FIG. 1 and be compared with the current training output image Tout to determine the current loss error E1. By combining the input with the output, the network does not need to "learn" to do nothing when the input already matches the desired output (Tout), (e.g., makes the Identity "Input=Output" trivial). In practice, this may speed up training and produce better results. Additionally, the present architecture may use a customized loss function that determines an L−1 loss (e.g., a sum of absolute differences) and an L−2 loss (e.g., a sum of square differences) when comparing Uout with Tout, and combines the two losses (e.g., by weighted summation) to define E1. Preferably, the L−1 loss is weighted more heavily than the L−2 loss when defining E1 to ensure faithful representation of the original image/scan. Error measures E2 and E3 may be determined by L−1 loss, L−2 loss, or a combination of both. Error measures E1, E2, and/or E3 may be weighted by a gain (e.g. α1, α2, and/or α3 respectively). For example, E2 may be weighted by a gain of α2=0.2, E3 may be weighted by a gain of α3=0.2, and E1 (which may be a combination of L−1 loss and L−2 loss) may be weighted by a gain of α1=0.6, such that all the gains sum up to 1 and the loss error of the output module (e.g., E1) is weighted more heavily. The resultant total loss error may then be fed back through the neural network in a back-propagation process. Using deep supervision limits the output so that it does not create (or substantially limits the creation of) fictional structures (e.g. structures not found in the input image). When dealing with medical images, avoiding the creation of fictitious structures in an output image is of premium importance to clinicians. Thus, the present deep supervision architecture makes for faster convergence and better feature representation than a traditional U-net structure. It is to be understood that the present deep supervision architecture would be used in the training of a ML model in accord with the present invention, but once the ML model is trained, the weights and biases of the various stages/modules would be set (e.g., fixed) and it may not be necessary to use the deep supervision portion during of the architecture in an operational stage of the trained ML model.

The present NN architecture of FIG. 1 may be used to train an ML model to accomplish multiple tasks. A first task may be image translation and a second task may be noise reduction. For ease of discussion, each task is discussed separately, as follows.

Image Translation

Individual OCT/OCTA scans suffer from jitter, drop outs, and speckle noise, among other issues. These issues can affect the quality of en face images both qualitatively and quantitatively, as they are used in the quantification of vasculature density. The present invention seeks to improve the quality of an ophthalmic image by use of a trained neural network. As is explained below, this requires multiple training pair sets, e.g., a training input image paired with a corresponding ground truth, target training output image. A difficulty with using deep learning is obtaining ground truth outputs for use in the training set. The quality (e.g. vessel continuity, noise level) of true averaged images is generally far superior to that of an individual scan. Thus one approached in the present invention is to translate a single ophthalmic input image to an average-simulating image, e.g., an image that has characteristics of a true averaged image. In this approach, true averaged images are used as ground truth images (e.g., as training output images) in the training of the present neural network. Another approach is to translate an ophthalmic input image of a first modality to an output ophthalmic image simulating a different modality that typically has a higher quality. For example, AO-OCT images may be used as ground truth, training output images to train a neural network to produce AO-simulating image. For ease of discussion, much of the following discussion describes the use of true averaged images as ground truth, target output images in a training set, but unless otherwise stated, it is be understood that a similar description applies to using AO-OCT images (or other higher quality and/or higher resolution images) as ground truth target outputs in a training set.

Figure 2:
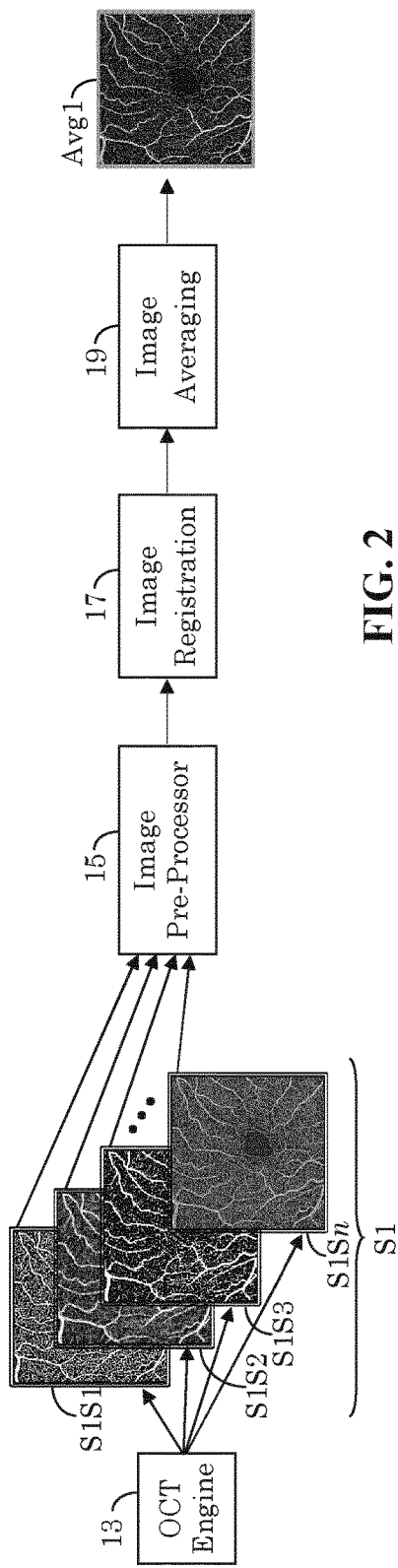
FIG. 2 illustrates a process for creating a ground truth, true averaged image.

FIG. 2 illustrates a process for creating a ground truth, true averaged image Avg1. An ophthalmic imaging system such as an OCT/OCTA system 13 (such as illustrated in FIGS. 22 and 24) captures an image set S1 consisting of n individual images/scans S1S1 to S1Sn of the same region of a sample (e.g., an eye). For example, the first scan of image set S1 is labeled S1S1, and the n$^{th}$ scan of image set S1 is labeled S1Sn. Similarly, if a second image set S2 (not shown) of p scans were collected, then the individual scans in second image set S2 may be labeled S2S1 to S2Sp. Irrespective, the individual scans (e.g., S1S1 to S1Sn) of an image set may optionally be subjected to image pre-processing (e.g., illumination correction, blur and focus correction, filtering and noise removal, edge enhancement, etc.) by an image pre-processor module/block 15 before being submitted to an image registration (e.g. alignment) module/block 17, which essentially aligns the pre-processed scans within an image set (e.g., S1). The individual scans (S1S1 to S1Sn) may be registered by identifying characteristic features (e.g., polygon shape descriptors (e.g., vessel structures), spectra descriptor (e.g., SIFT, SURF), etc.) within each individual scan, identifying matching characteristic features within multiple individual scans, and aligning the individual scans by aligning their respectively matched characteristic features. This process generates multiple image alignment settings (e.g., registration parameters). The aligned scans/images are then averaged (e.g., by image averaging module/block 19) to produce true averaged image Avg1. Registering and averaging the individual scans/images within each of multiple image sets, generates a respective averaged image for each image set, where each averaged image is of higher quality than the constituent images within its corresponding image set. However, generating a true averaged image takes considerably more time, which limits its application. The present invention may use multiple image sets of individual scans and their corresponding averaged images to train a neural network.

Figure 3:
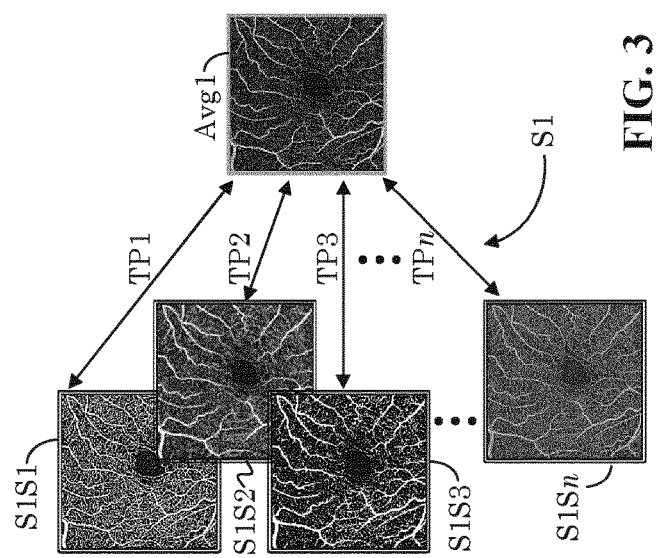
FIG. 3 illustrates a method for defining a set of training sample pairs for training a neural network in accord with the present invention.

FIG. 3 illustrates a method for defining a set of training sample pairs. In the present example, each of the individual scans S1S1 to S1Sn is separately paired with their corresponding true averaged image Avg1 to define n separate training pairs TP1 to TPn, where each of scan S1 to Sn is a separate training input to a neural network, and their corresponding true averaged image Avg1 is each input's corresponding target training output. As it would be understood, multiple training pair sets may be defined by obtaining multiples image sets (e.g., S1, S2, . . . , Sm) of various regions of an eye, and averaging the constituent scans of each image set to define a corresponding true averaged image for each image set, as illustrated in FIG. 2.

Figure 4:
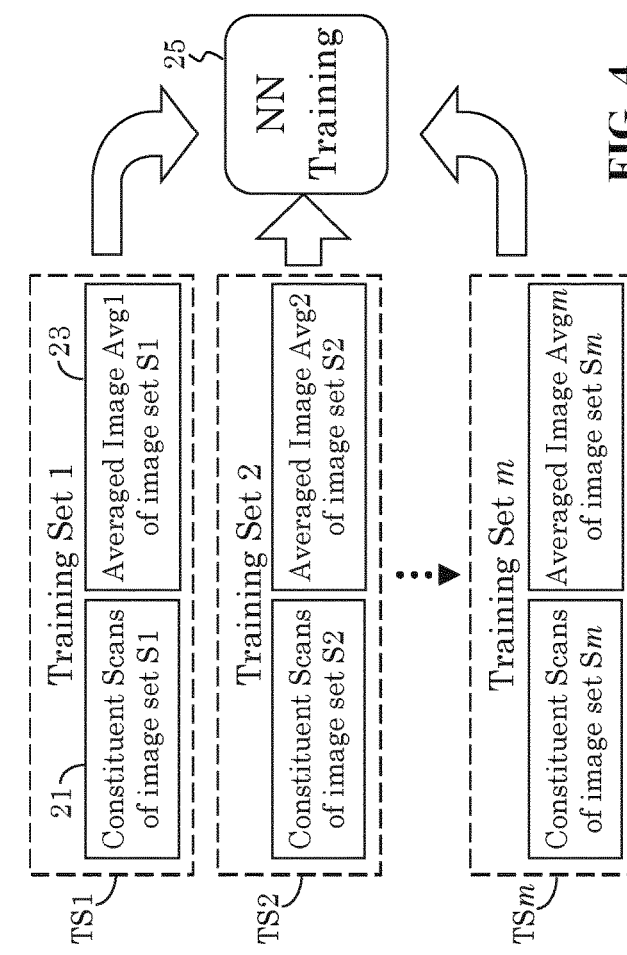
FIG. 4 illustrates the training of a neural network in accord with the present invention.

FIG. 4 illustrates the training of a neural network 25 (such as that shown in FIG. 1) in accord with the present invention. In the present example, multiple training pair sets TS1 to TSm are collected. Each training set consist of a set of constituent OCT/OCTA scans 21 and used to define their corresponding true averaged image 23. Each training set (TS1 to TSm) may be submitted to neural network 25 for training, as described below. Optionally, pre-processor module/block 15 may be omitted and neural network 25 may be trained on raw data (scans/image), instead of pre-processed (e.g., filtered) data.

Figure 5:
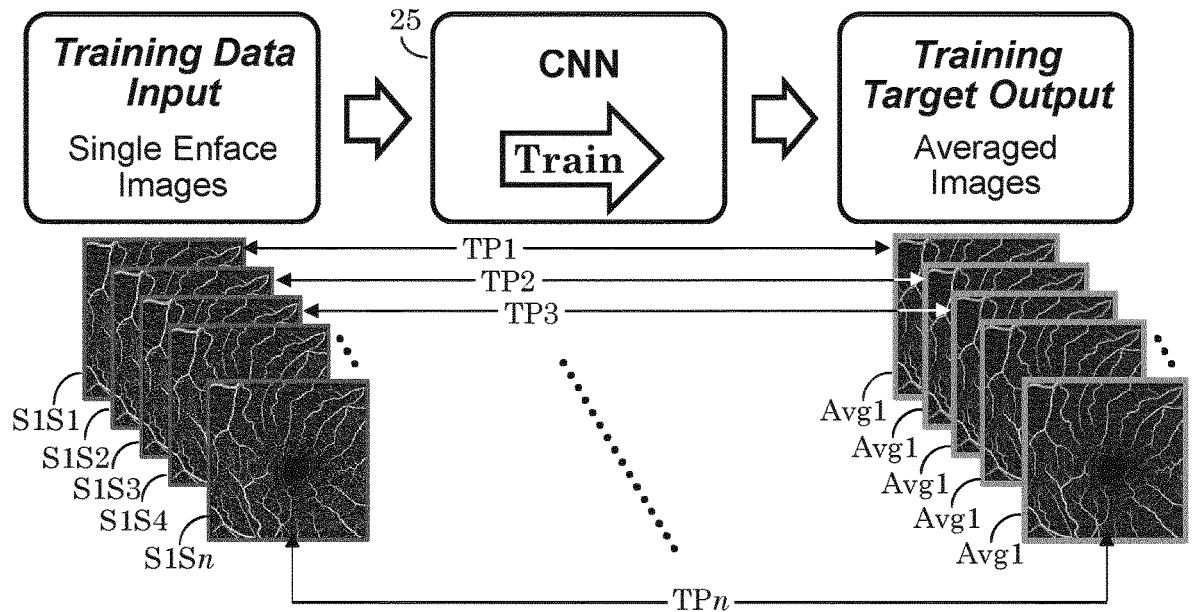
FIG. 5 provides another illustration of the training of a (e.g., convolutional) neural network in accord with the present invention.

FIG. 5 provides another illustration of the training of a (convolutional) neural network 25 in accord with the present invention. As before, each training pair TP1 to TPn consists of an individual image/scan S1S1 to S1Sn supplied as a training input sample paired with its true averaged image Avg1, supplied as a target training output sample. During the training phase, the convolutional network (e.g., NN of FIG. 1) 25 is thus trained on single scan images S1S1 to S1Sn as training inputs and their true averaged image Avg1 as corresponding training outputs.

Figure 6:
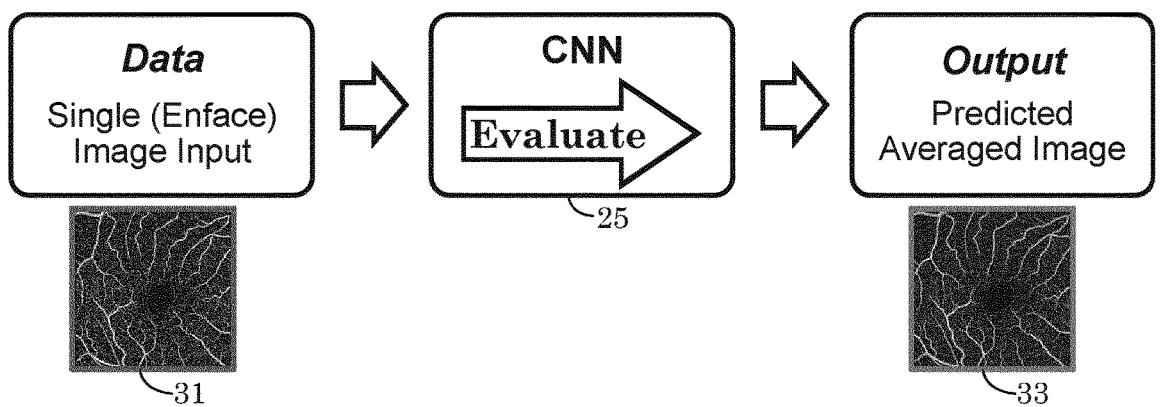
FIG. 6 illustrates an example operation of a convolutional neural network, either with live data input after training or with test data input during an evaluation phase.

FIG. 6 illustrates an example operation of the present CNN 25, either with live data input after training or with test data input during an evaluation phase. The present CNN 25 receives a single ophthalmic image 31 (e.g., a live OCT/OCTA scan) as input, and predicts (e.g. generates) a corresponding output image 33 (e.g. an average-simulating image with characteristics of a true averaged image, or an output image with characteristics of a different imaging modality, e.g. AO-simulating image, according to training). In the present example, the output image 33 is an average-simulating image, and has characteristics of a true averaged en face image. In other words, output image 33 simulates the averaging of the input image with multiple hypothetical images of a similar region as taken by the input image. It is noted that input image 31 is not an image used in training, or an image derived from any image used in training. That is, an input test scan (e.g., 31) not seen before by the network 25 is selected for the testing/evaluation/operation phase, and the network 25 predicts a possible output corresponding to a situation where the input image was part of a set of images that was averaged together.

As is explained above, creating a true averaged image requires registering multiple, individual scans/images that are to be averaged together. Establishing good registration among the individual scans may be complicated by the individual scans not being of sufficient quality. Consequently, the resultant averaged images may be less than optimal, e.g., it may show haziness and/or blurring. Thus, sometimes a true averaged image is not necessarily of higher quality than an individual image if the true averaged image is the result of a bad registration of multiple images. The present invention may also be used to improve the registration of individual images to define true averaged images of higher quality.

Figure 7:
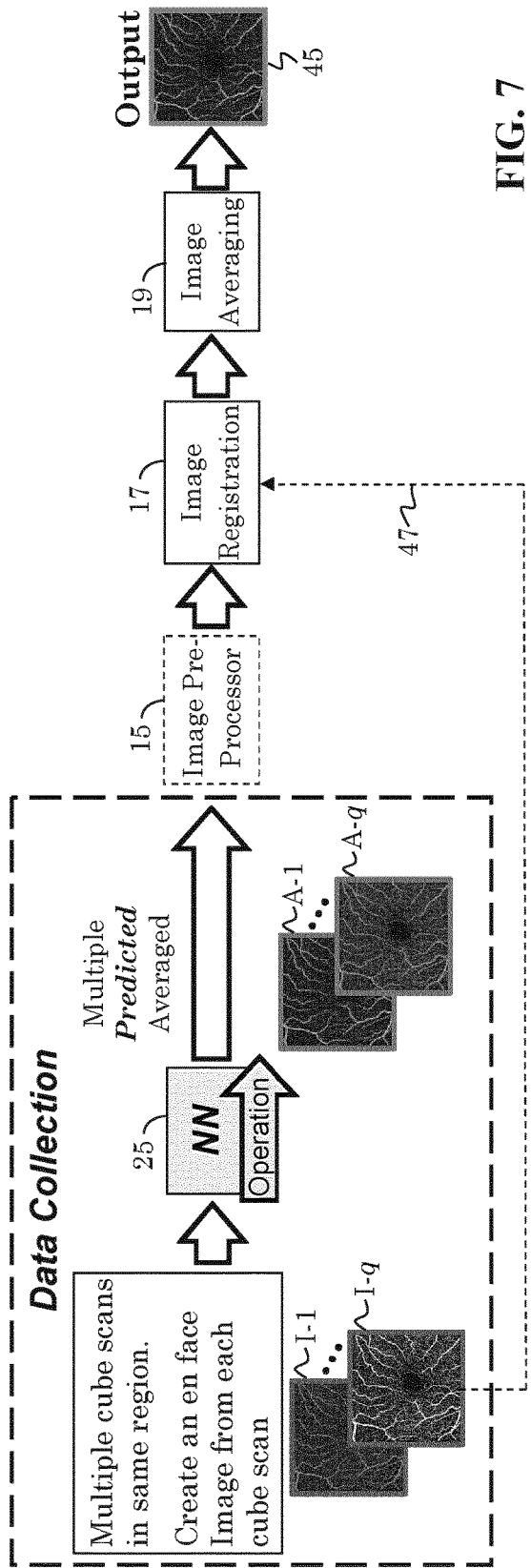
FIG. 7 illustrates the implementation of a trained neural network into a workflow for averaging multiple scans/images similar to the workflow of FIG. 8.

With reference to FIG. 7, a present trained NN 25 may be incorporated into a workflow for averaging multiple scans/images similar to the workflow of FIG. 2. For example, the present workflow may begin with data collection, wherein multiples OCT/OCTA scans I-1 to I-q of the same region of a sample are collected. Optionally, the multiple scans I-1 to I-q may be en face images, B-scans, cube scans, etc. Irrespective, the input scans I-1 to I-q are submitted to a trained neural network 25 (e.g., based on any, or combination, of the neural networks of FIGS. 1 and 25-28), and the neural network 25 produces a separate and corresponding translated image A-1 to A-q for each input image I-1 to I-q. Each translated image A-1 to A-q may be a higher quality image than its corresponding input image I-1 to I-q, which facilitates their registration (e.g., alignment) by image registration block 17. Because of the better registration of images, the result of averaging will be better than if the original scans I-1 to I-q were averaged directly, as described above in reference to FIG. 2. Optionally, output images A-1 to A-q from neural network 25 may be submitted to an image pre-processor block 15 prior to being submitted to image registration block 17, which applies at least one of multiple image registration techniques known in the art and generates image registration settings (e.g., registration parameters or transform parameters). Because images A-1 to A-q output from neural network 25 are of better quality than original images I-1 to I-q, image registration block 17 can provide better registration, and image averaging module 19 can thus provide a higher quality true averaged image 45. That is, averaging module 19 may average together the transformed images A-1 to A-q. Alternatively, since there is a one-to-one correspondence between translated images A-1 to A-q and input images I-1 to I-q, the registration/transform parameters generated by image registration module 17 for each individual image A-1 to A-q may be applied to individually corresponding input images I-1 to I-q so as to register (e.g., image align) input images I-1 to I-q using registration parameters from images A-1 to A-q, as indicated by dotted line 47. In this manner, the thus registered (e.g. aligned) input images I-1 to I-q may then be averaged by image averaging module 19 to produce a true averaged image of input images I-1 to I-q. Optionally, irrespective of whether averaged image 45 is the result of averaging registered images A-1 to A-q, the result of averaging input images I-1 to I-q, or a combination of both, average image 45 may optionally be used to generate new training sample pairs, which may then be submitted to neural network 25 to provide additional training, or may be used to train another neural network, or may be used for further processing.

In the above discussed embodiments, the present image translation neural network is trained on pairs of corresponding input and output images. For example, to train the neural network to create average-simulating images, multiple OCT/OCTA scans of the same region of an eye are taken, registered/aligned to each other, and averaged together. This creates multiple training sample pairs where each of the multiple scans may be paired to its corresponding true averaged image. The present network thus learns the weights needed to translate the image style of single input images to the image style/characteristics of images of different imaging conditions or a different imaging modality (e.g., average-simulating image or AO-simulating image). Using true averaged OCT images (or true AO-OCT images) forces the network to learn from real image characteristics rather than smoothing or coherence-based approaches which look for auxiliary image characteristics.

Deep learning networks may benefit from very large datasets. Optionally the number of training sample pairs may be increased by using a patching-based scheme to train the network on smaller patches of the training images.

Figure 8:
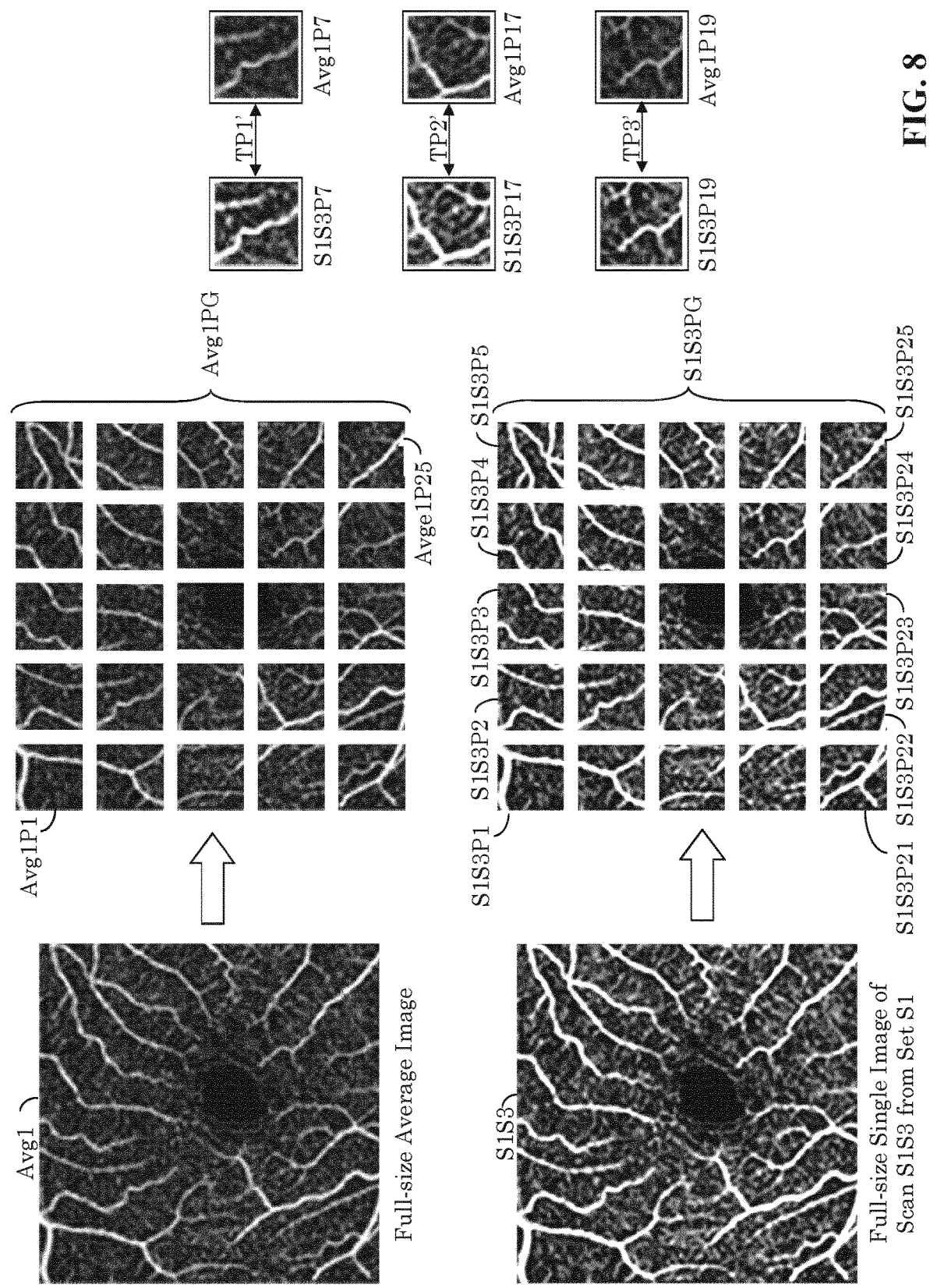
FIG. 8 illustrates a patching-based scheme in accord with the present invention for training a neural network using pairs of corresponding image patches.

FIG. 8 illustrates a patching-based scheme in accord with the present invention for training a neural network using pairs of corresponding image patches. A full-size, single image S1S3 and a corresponding full-size true averaged image Avg1 is shown. For example, full-size image S1S3 may be part of a set of images that are averaged together to define true averaged image Avg1, as is discussed above. Although full-size images may be used for training, the images in each training pair may optionally be divided into multiple, similarly sized and corresponding image-segments (e.g., patches). For example, full-size image S1S3 may be divided into a first patch group S1S3PG of twenty-five patches (S1S3P1 to S1S3P25), and full-size, true averaged image Avg1 may similarly be divided into a second patch group Avg1PG of twenty-file patches (Avg1P1 to Avg1P25). In the present example, the patches are numbered consecutively in five rows such that the top, first row of patches of patch group S2S3PG are numbered from S1S3P1 to S1S3P5, and so on down to the last row of patches numbered S1S3P21 to S1S3P25. It is to be understood that full-size images S1S3 and Avg1 may be divided into any number of corresponding patches, such as 64×64 tiles/patches or any other number of patches. Irrespective, each patch in patch group S1S3PG has a corresponding patch in second group Avg1PG, and each pair of corresponding patches may define a separate training pair. For illustration purposes, three training pairs of corresponding patches (TP1', TP2', and TP3') are shown. In the present example, training pair TP1' consist of patch S1S37 as training input and corresponding patch AvgP7 as training target output. Similarly, training pair TP2' consist of training input patch S1S3P17 and training target output patch Avg1P17, and training pair TP3' consists of training input patch S1S3P19 and training output patch Avg1P19. In this manner, the neural network may be trained on pairs of patches from single scans and corresponding patches from true averaged scans (or true AO-OCT scans).

Figure 9:
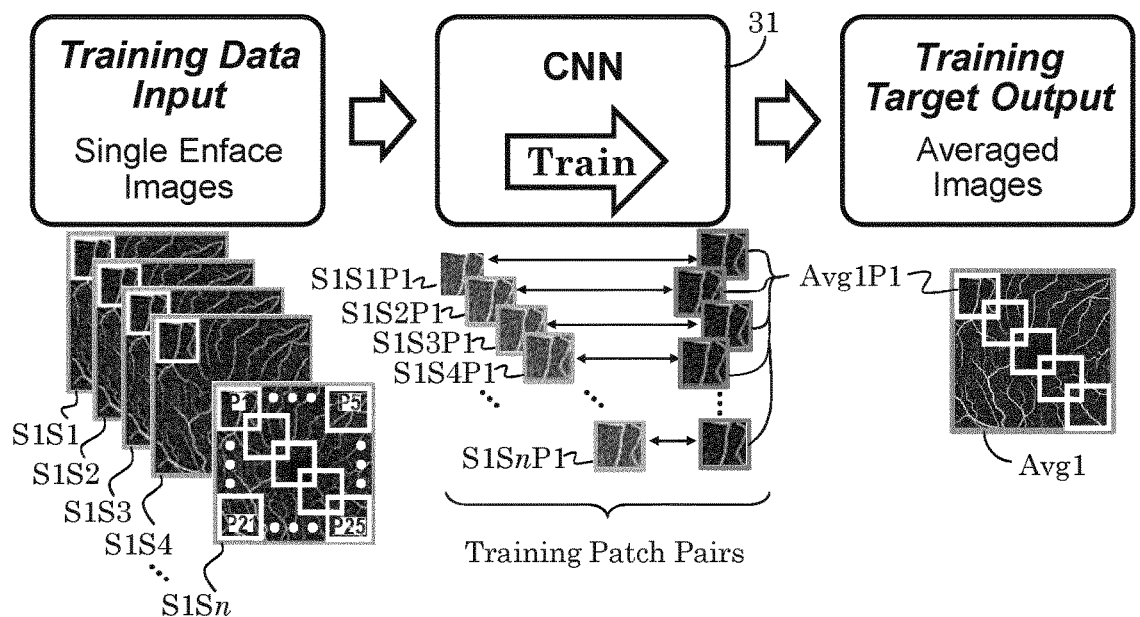
FIG. 9 illustrates the use of pairs of corresponding patches to train a neural network in accord with the present invention.

FIG. 9 illustrates the use of pairs of corresponding patches to train a neural network in accord with the present invention. Each full-size, single image/scan S1S1 to S1Sn is divided into a plurality of patches (e.g., P1 to P25), and their corresponding true averaged image Avg1 is divided into a similar number of similarly sized patches. Individual patches from each single image/scan are paired with their corresponding patch from the averaged image to define training patch pairs. For example, the upper left patch (S1S1P1 to S1SnP1) from each sample image (S1S1 to S1Sn) is paired with the upper left patch Avg1P1 of the averaged image Avg1. In this manner, neural network 31 is trained on a large number of pairs of patches from full-size scans and the corresponding patches from full-size, true averaged scans. The network weights thereby learn to transfer the image style of single image patch to the image style/characteristics of a single averaged image patch.

Figure 10:
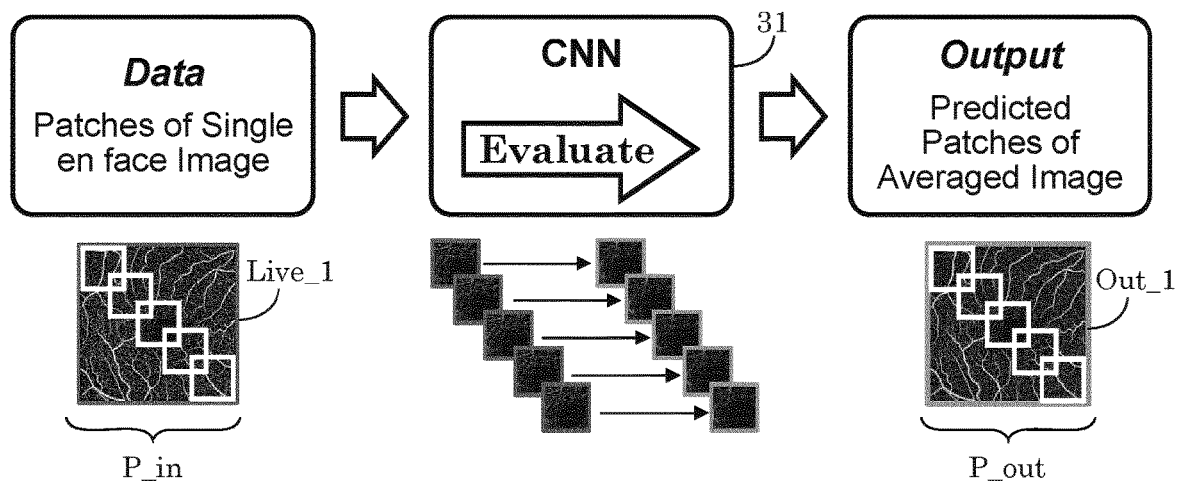
FIG. 10 illustrates the operation of a neural network trained on pairs of image patches in accord with the present invention.

FIG. 10 illustrates the operation of a neural network trained on pairs of image patches in accord with the present invention. In operation, or during inference and/or testing, a test input image (or live image) Live_1 is broken down into a group of input patches P_in (of similar number and size as used to train neural network 31), and each individual patch is run through the neural network 31 to produce a corresponding group of transformed, output image patches P_out. The produced group of patches P_out may then be seamlessly reconstructed (e.g., montaged) to form a single output image Out_1.

As stated above, the present embodiments of translating a single input image to an average-simulating image may be extended to translating an input OCT/OCTA image of a first modality to an output OCT/OCTA image with characteristics of an OCT/OCTA image of a second, different modality. This may be achieved by acquiring multiple OCT/OCTA scans of the same region of an eye with two OCT/OCTA systems of differing modality, registering the scans and training the neural network on the registered scans. For example, one OCT/OCTA system may be an SS-OCT and the other OCT/OCTA system may be of an AO-OCT. In this case, the SS-OCT and AO-OCT scans/images may be registered together, and corresponding images may be paired to define training sets (e.g., a training input image from the SS-OCT system and a corresponding target training output image from the AO-OCT image). If the images/scans produced by the two OCT/OCTA modalities are of dissimilar size, they may optionally be divided into patches of similar size to define training pair sets of patches in a manner similar to that described above.

FIG. 11 illustrates the use of a set of individual AO-OCT images 67 produced by an AO-OCT system 65 to train a neural network in accord with the present invention. As shown, an SS-OCT system 61 produces a scan/image 63 that is generally larger than any individual image produced by AO-OCT system 65. In the present example, AO-OCT system 65 needs to capture a set 67 of multiple images/scans to span the same region covered by a single image/scan 63 from SS-OCT 61. In this case, single image 63 from SS-OCT 61 may be divided into a group of image patches 69 of similar size as, and corresponding to, image set 67 of the AO-OCT system 65. Alternatively, the set of images 67 may be divided into even smaller patches, and single image/scan 63 may be divided into smaller patch sizes that match and correspond to the smaller patches derived from the set of images 67. Irrespective, each image patch from SS-OCT unit 61 and its corresponding AO-OCT image/patch may be paired to define a training sample pair, where the SS-OCT image patch is input to the neural network for training, and the corresponding AO-OCT image/scan a target output for training the neural network. For illustration purposes, three training pairs (TP1", TP2", and TP3") of corresponding patches/images are shown. The training pairs may then be used to train a neural network, as is explained below.

Figure 12:
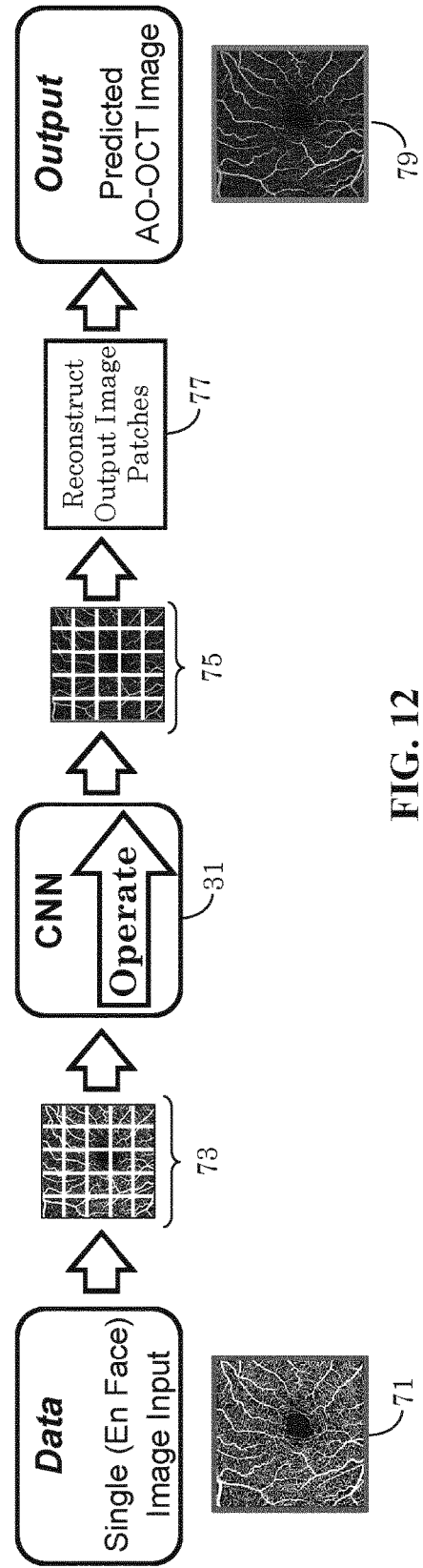
FIG. 12 illustrates the operation of a neural network trained to output images/scans having characteristics of an AO-OCT.

FIG. 12 illustrates the operation of a neural network trained to output images/scans having characteristics of an AO-OCT. During an operational phase (or evaluation/testing phase), an input scan 71 (such as a scan from an SS-OCT system) is collected and divided into a group of image patches 73, preferably of similar size as the patches/images used to train the neural network 31, such as explained above in reference to FIG. 11. The trained neural network 31 receives image patches 73 and translates each patch into a corresponding output patch having characteristics of a scan from an AO-OCT system (e.g., it mimics an AO-OCT system). Neural network 31 thereby produces a group of output patches 75, which are then montaged by a reconstruction module 77 to output AO-simulating image 79, e.g., an image resembling a large scan produced by an AO-OCT system.

During inference/testing/operation, a trained neural network architecture in accord with the present invention takes as input individual scans and predicts an output image with characteristics of a higher quality image. For example, the output image may mimic a true averaged image or a true AO-OCT image. Experimental results of using this approach show that using superficial scans (e.g., en face images) as inputs produces outputs resembling true averaged images very closely. The present ML model produces an output image with decreased unwanted characteristics, such as dropouts and/or jitter, and increased image quality including connectivity in vessel structure and fewer noise artifacts while eliminating, or minimizing, creation of fictitious structures. In essence, the present deep learning NN learns an implicit understanding of the structure of vessels that is not possible using traditional image enhancement techniques.

Figure 13A:
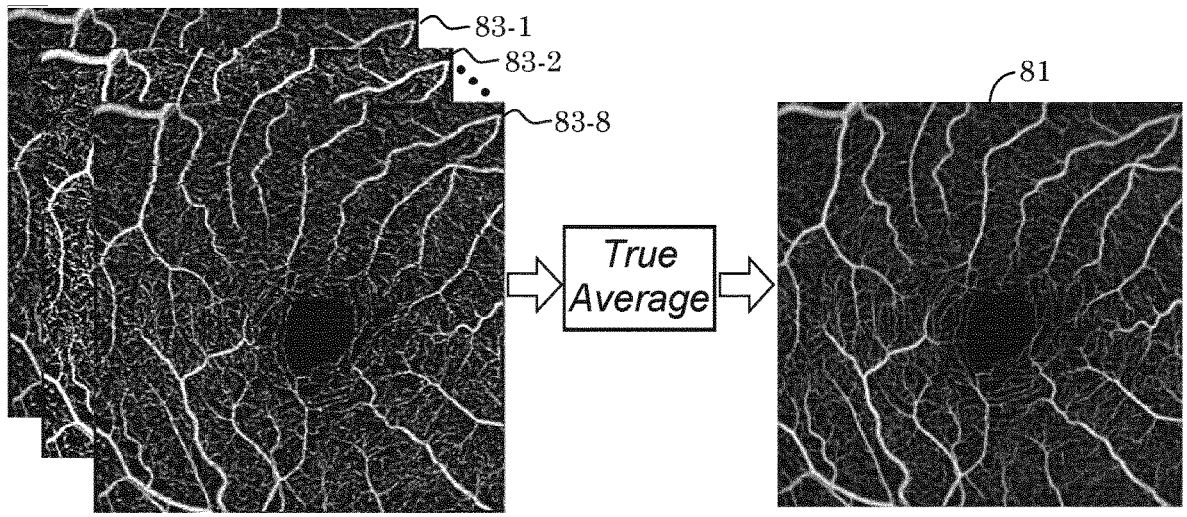
FIGS. 13A and 13B compare a true, averaged image with a "predicted averaged" (e.g., averaged-looking) image produced with a trained neural network in accord with the present invention.
Figure 13B:
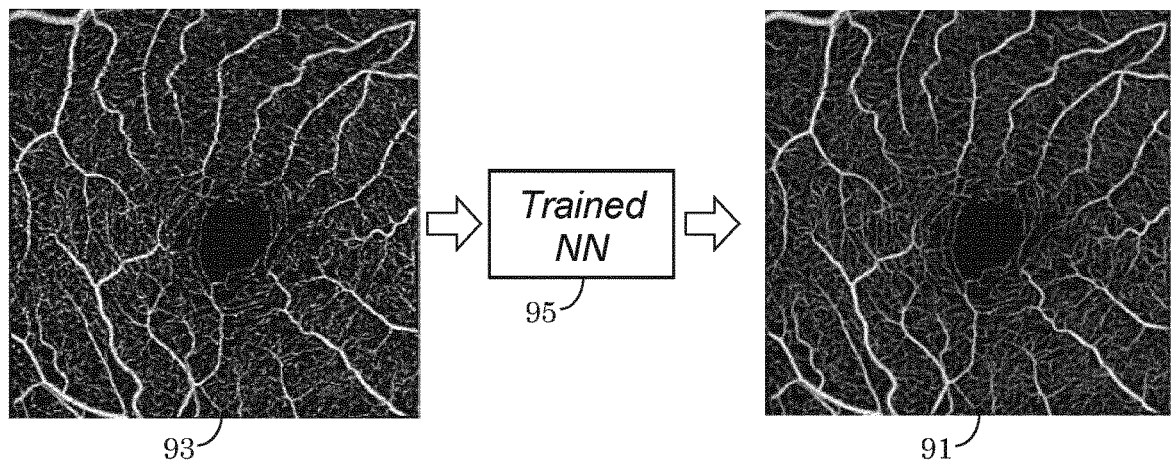

For example, FIGS. 13A and 13B compare a true averaged image 81 with an average-simulating image 91 produced with a trained neural network 95 in accord with the present invention. In FIG. 13A, eight individual scans 83-1 to 83-8 are averaged by an averaging module (e.g., similar to that of FIG. 2) to produce true averaged image 81. Similarly, trained neural network 95 receives a single input image 93 (not included among images 83-1 to 83-8), and predicts an average-simulating image 91. As shown, average-simulating image 91 improves vessel structure connectivity, reduces jitter, and closely resembles true averaged image 81 without introducing artificial vascular structures.

Figure 14:
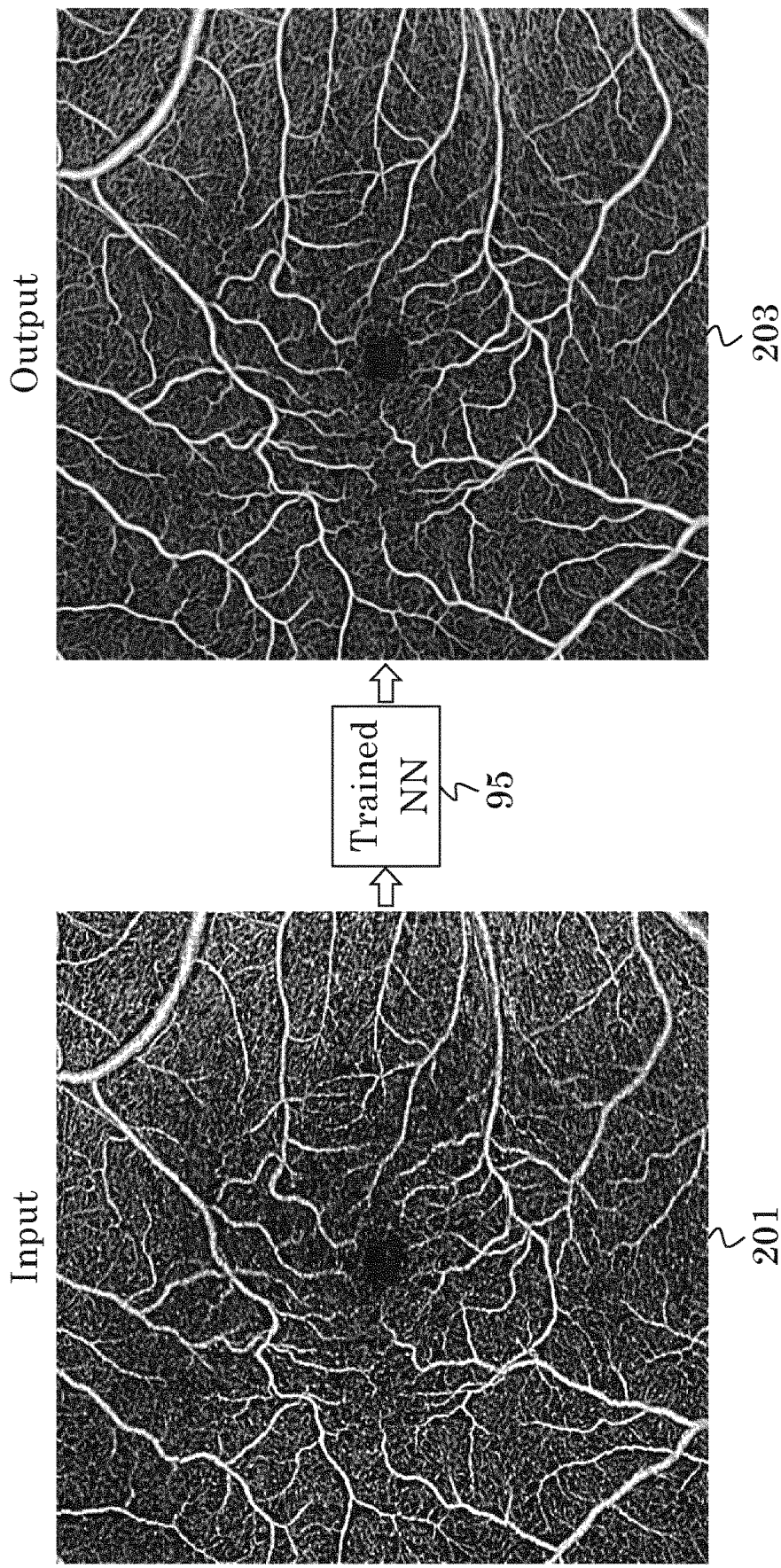
FIG. 14 illustrates another application of the present invention where a 6 mm input image/scan is submitted to a trained neural network to produce a predicted averaged-looking 6 mm image.

FIG. 14 illustrates another application of the present invention where a 6 mm input image/scan 201 is submitted to a trained neural network 95 to produce a 6 mm average-simulating image 203. Again, average-simulating image 203 provides a higher quality representation of image 201 without introducing fictitious neural structures. That is, average-simulating image 203 connects gaps in the vasculature of input image 201 without introducing new (e.g., fictitious) vasculature structures not found in input image 201. Average-simulating image 203 further maintains consistency with vasculature thickness/size as compared with corresponding vasculature in input image 201.

Figure 15:
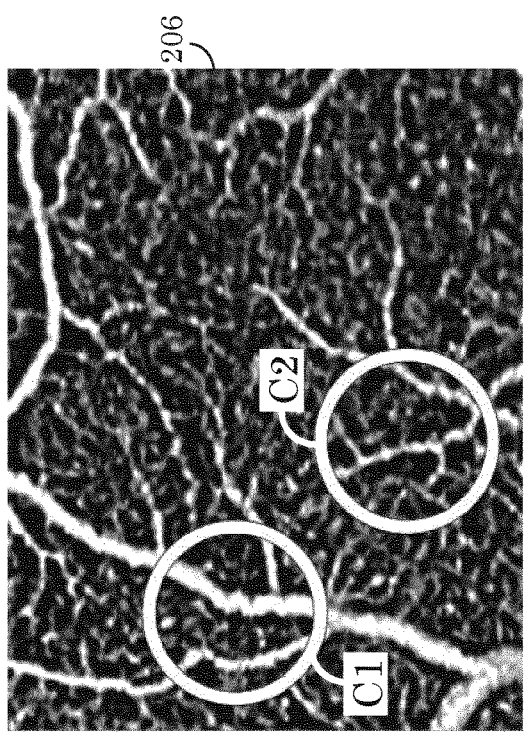
FIG. 15 shows an example ophthalmic (e.g., en face) image that is input to a NN ML model that is trained on averaged images and/or averaged patches.
Figure 16:
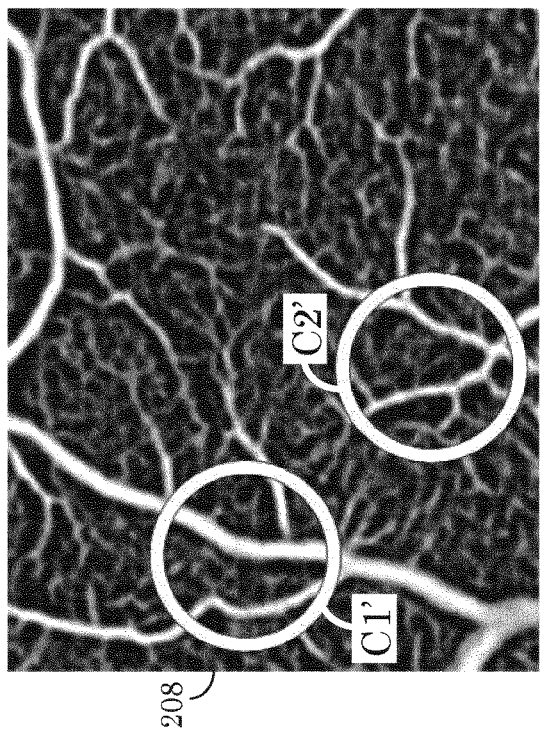
FIG. 16 shows the resultant output image produced by the trained NN ML model in response to receiving the input image of FIG. 21.

For example, FIG. 15 shows an example ophthalmic (e.g., en face) image 206 that is input to a NN ML model, which is trained on true averaged images and/or patches. Circles C1 and C2 identify regions of jitter in the input image 206. FIG. 16 shows the resultant average-simulating image 208 produced by the trained NN ML model in response to receiving the input image 208 of FIG. 15. The regions of circles C1' and C2' in FIG. 16 correspond to the regions of circles C1 and C2 in FIG. 15. As is evident, the output image 208 of FIG. 16 enhances the vessels clearing out jitter and noise.

Figure 17A:
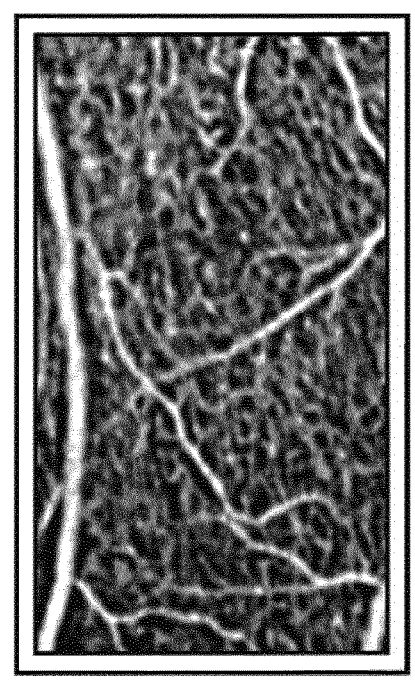
FIGS. 17A and 17B illustrate that the presently trained NN model learns the structure of vessels of an eye.
Figure 17B:

FIGS. 17A and 17B illustrate that the presently trained NN model learns the structure of vessels. FIG. 17A illustrates a true averaged image created from a group of individual images, at least one of which is of low quality and hampers registration of the individual images. For example, one of the images/scans may be an en face image that includes discontinuities due to registration error in the B-scans from which it is created. This lack of good registration may hamper averaging resulting in a hazy, true averaged image. FIG. 17B illustrates the result of inputting one of the individual images used in the creation of the true averaged image of FIG. 17A to the presently trained NN. As shown, the present deep network attempts to maintain the vessel network structure, and it does so without introducing the haziness evident in FIG. 17A.

Thus, in the case of lower quality scans, the present NN ML model may create images better than those achievable from construction of a true averaged image. Furthermore, the image quality (e.g. vessel continuity, noise level) achievable with the present invention is generally superior to that of an individual scan, and can provide better visualization. It also forms better inputs for downstream tasks such as density computations and hybrid schemes of averaging, as discussed above.

The present NN learns to maintain vessel continuity based on the examples that it is exposed to during training. As it would be understood, some pathologies may result in abnormal vessel structures, including vessels of unusual thickness/size. To improve the present NN ML model's ability to improve the visualization of such abnormalities, it may be beneficial to include scan/image examples of various types of diseased vessels in its training. For example, scans/images of vascular structures resulting from hypertensive retinopathy, micro aneurysm, and retinal vein occlusion (RVO) may be included in the training sets used to train the present neural network. In the present case, it may not be necessary to label these examples as diseased, but rather merely include them in the training set so as to train the neural network on a wide variety of true vascular structures ranging from normal to diseased vessels.

Figure 18:
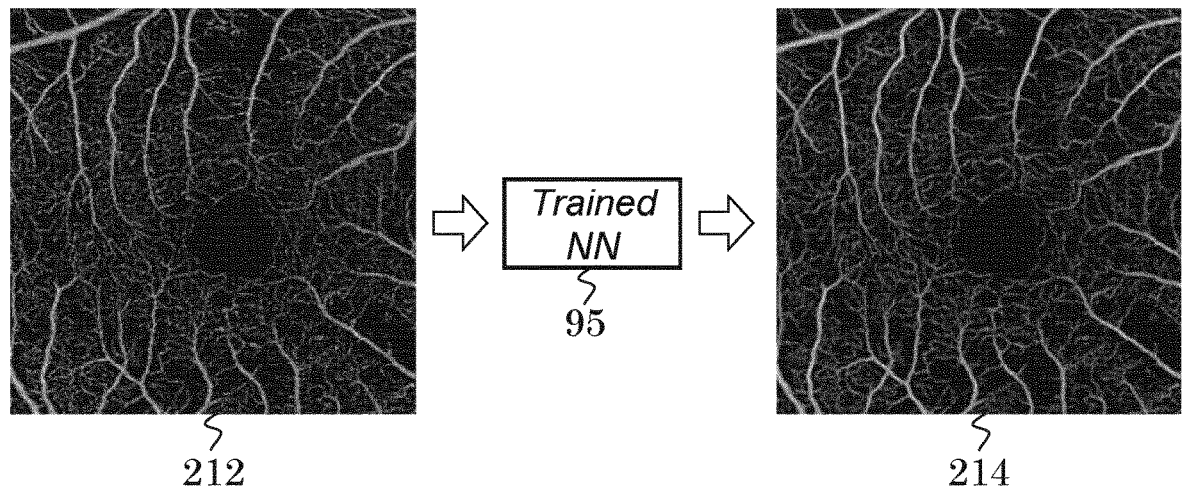
FIG. 18 shows the result of inputting an image of a diseased eye to a neural network trained in accord with the present invention.

As an example, FIG. 18 shows the result of inputting an image 212 of a diseased eye to a trained neural network 95. As shown, the output image 214 improves vascular visualization without introducing fictitious structures.

Noise Reduction

The various neural network architectures discussed herein, including that of FIG. 1, may be extended to other applications. For example, the present neural network architecture may be used to train a neural network (NN) machine learning (ML) model to reduce the noise (e.g., denoise) of OCT/OCTA scans/images, such as A-scans, B-scans, Cube scans, and en face images. Traditionally, improvement of individual OCT scans involves improving the signal-to-noise (SNR) ratio in the test instrument (e.g., the specific OCT system being used), registering the individual OCT scans (e.g., B-scans) to a corresponding line scanning ophthalmoscope (LSO) image (usually the one most recently acquired) used for motion tracking, and post-processing the scans to register the scans to the LSO image that was being captured substantially at the same time the OCT scan was being taken. Software-based methods for reducing noise are also known. These methods typically focused on 'super-resolution' techniques, which assume the existence of a 'clean' image, and known noise distributions.

Neural networks have also been used to denoise images. Typically, when training a neural network to denoise an image, one obtains a pristine image (e.g., the exemplary, target training output image) and adds specific types of noise (e.g., known noise distributions) to the pristine image using various noise-adding filters, known in the art, to create artificially noisy training input samples. These artificially-created noisy training input samples are then paired with the pristine image (from which they were created) to form training pairs. The thus created, artificially-noisy samples are used as training inputs to a neural network and the pristine image is used as a target training output for the neural network. An example of this approach is described in *A Deep Learning Approach to Denoise Optical Coherence Tomography Images of the Optic Nerve Head*, arXiv: 1809.10589 [cs.CV], by Devalla, S. K. et al., which examines the feasibility of using a neural network to denoise an OCT scan with specific, known type(s) of noise. Devalla tests the effectiveness of his trained neural network by selecting, from among the same artificially-noisy samples used to train the neural network, samples to be used as test samples. These test samples are submitted to the trained neural networks to determine the neural network's ability to remove the specific type of artificial noise it was trained to remove.

In contrast to this approaches, the present neural network is trained on a collection of true (i.e., not artificially noisy) images, and uses live images (i.e., not images used in the training of the neural network) to evaluate the performance of the present trained neural network. Furthermore, no pristine, clean samples are needed, or used, to train the present neural network.

Individual OCTA scans and associated en face images are generally noisy. The noise directly affects the image quality and quantification results, such as vasculature density. As explained above, deep learning is a technique for developing machine learning models to process data, which has produced state of the art results on image processing problems. Any of the neural network architectures discussed herein may be used with the present invention, but the NN architecture of FIG. 1 is exemplarily used herein as a custom deep learning framework to denoise OCT scans/images (e.g., B-scans, en face images, etc.). This is achieved by submitting true (optionally random and/or raw, e.g., without pre-processing) pairs of OCT scans/images, which are typically noisy images, as training sample pairs to the present neural network. As it would be understood, a patching-based scheme may also be used to increase the size of a training set. Optionally, the pairs of training images may be of the same region of a subject (e.g. eye), but the pairs of training images may optionally be from dissimilar regions. Furthermore, no "prior" examples of clean images are used for training the present neural network. Thus, the present neural network ML model learns to denoise OCT scans/images without looking at additional "priors," e.g., ground truth examples (such as averaged images or cleaned images or higher quality images) or images having pre-defined noise distributions. This allows the noise statistics to be completely described by the data. Thus, the present NN ML learns to denoise un-seen noise characteristics and achieve greatly improved image quality, while simplifying the gathering of training pair samples.

Figure 19:
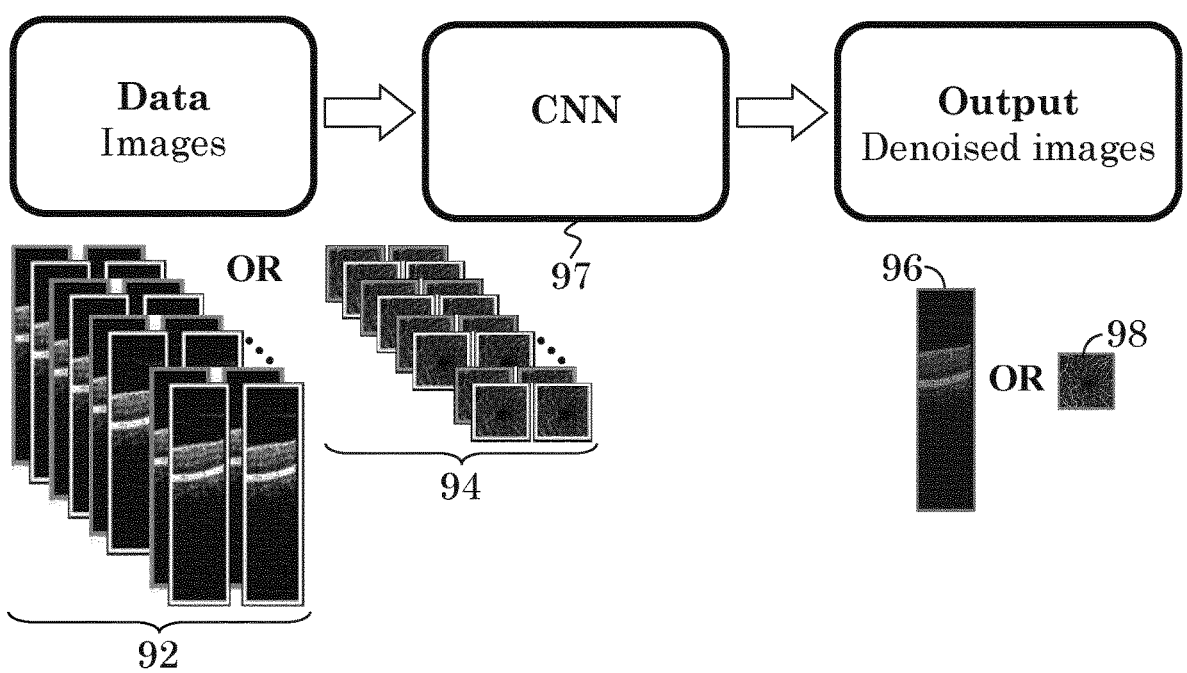
FIG. 19 illustrates the training of a neural network to denoise OCT scans/images in accord with the present invention.

FIG. 19 illustrates the training of a neural network to denoise OCT scans/images in accord with the present invention. The most difficult part of using deep learning to process en face/B-scans images can be obtaining ground truth (e.g., high quality and pristine), target output images (e.g., "priors") for use in a training set. As discussed above, one may use true averaged images as ground truth training output sample, or other related 'clean' images. These "priors" may be used as a means of super resolution. Another approach may be to define noise characteristics to intentionally degrade sample images with known noise characteristics, and to use the degraded image as training input images and the original sample images as 'clean' training output images. The presently preferred embodiment provides a significant advantage over these techniques by circumventing the need to use priors (for both the noise and the data). This is especially advantageous for use with OCT images with difficult to quantify speckle noise. The present (optionally convolutional) neural network 97 is trained to denoise OCT B-scan and/or en face images by only looking at pairs of raw input images (e.g., randomly assigning one of the images in each pair of images from the same region as a training input sample, and assigning the other image in the pair as a training output sample). That is, no special process is needed, or used, for selecting optimal images or for cleaning/pre-processing raw images to define training "priors." To train neural network 97 to denoise B-scans, pairs of B-scans 92 are used for training, and to train neural network 97 to denoise en face images, pairs of en face images 94 are used for training. In this manner, in operation, when a live B-scan or a live en face image is input to neural network 97, it will produce a denoised B-scan 96 or a denoised en face image 98, receptively. For example, in the training phase, the convolutional neural network 97 may be trained on pairs of images from the same scan (e.g., multiple scans of the same region in a manner similar to that used to define an angiography image or a true averaged image) or from registered en face images from the same region of the same eye. During the testing phase or operational phase, a single B-scan (or en face image) not seen before by the neural network 97 may be provided as input to the neural network 97, and the neural network 97 predicts the denoised output (B-scan 96 or en face image 98, as appropriate).

When collecting B-scans or en face images for training, any of the collected scans/images may be used as either a training input sample or a training output sample in a training pair. For example, when defining training sample pairs 92 or 94, the multiple B-scans or en face images may be raw images from random regions of an eye. However, training pairs may be constructed of scans/images of substantially the same region of the eye. Optionally, an OCT system may be made to generate scans/images of varying quality (e.g., the SNR may be lowered and/or select image processing may be omitted and/or motion tracking may be reduced or eliminated), such that the training pairs include a mixture of images of differing quality. Additionally, the present training method may include recording scans/images of exactly the same object structure but with different speckle (e.g. by changing the light polarization or angle). Thus, neural network 97 learns to denoise images using only raw images and no special priors (e.g., without spatial averaging) to denoise B-scans and/or enface images.

Figure 20:
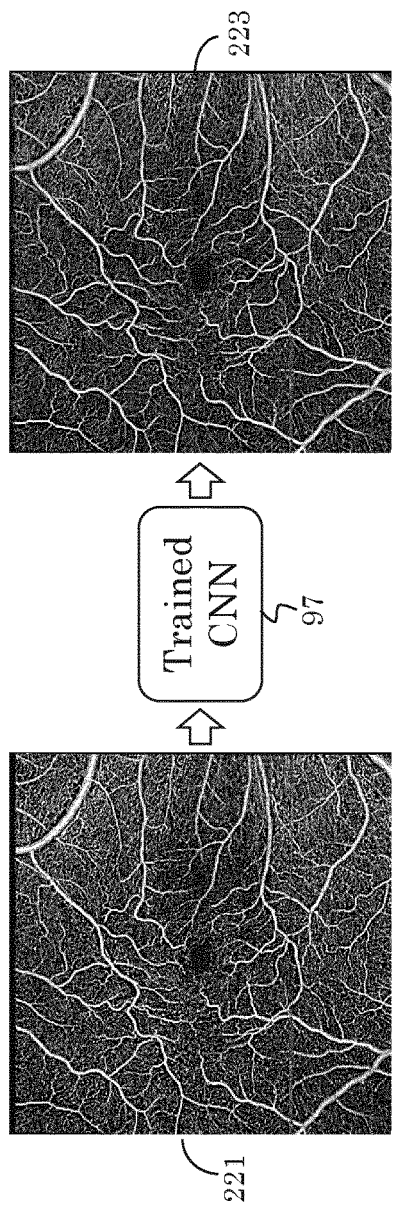
FIG. 20 shows an example live input en face image to a trained neural network in accord with the present invention, and the resultant denoised en face image.
Figure 21B:
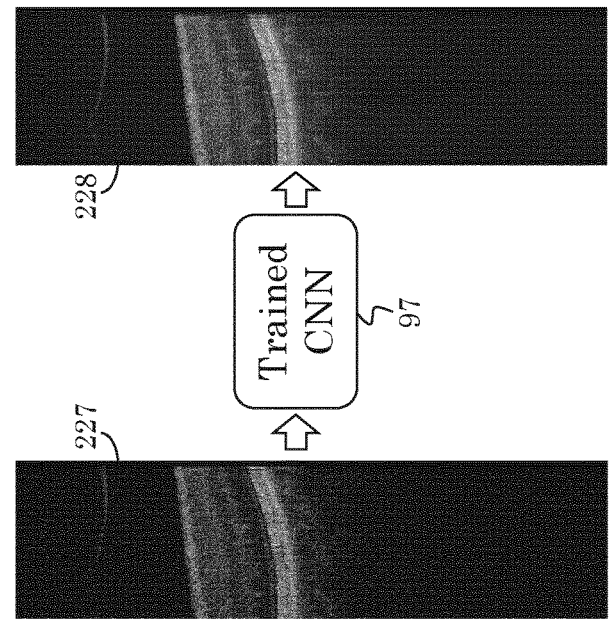
FIGS. 21A and 21B show two separate examples of a live B-scan input to trained neural network, and their respectively output denoised B-scans.
Figure 21A:
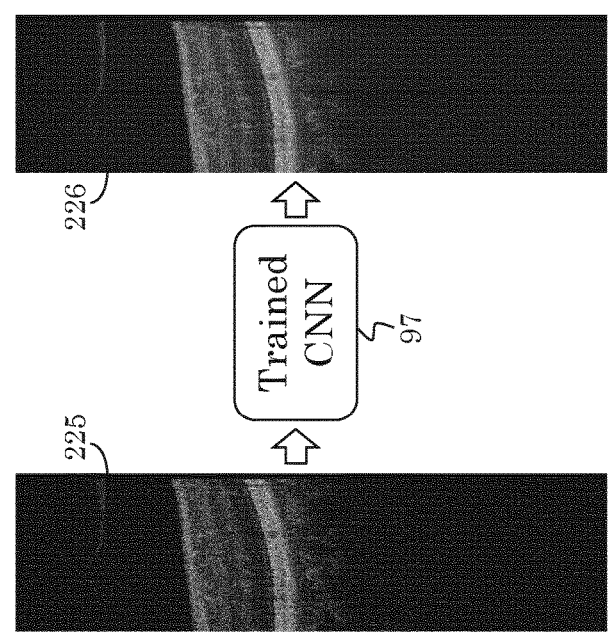

FIG. 20 shows an example live input en face image 221 used to a trained neural network 97 (in accord with the present invention), and the resultant denoised en face image 223. FIGS. 21A and 21B show two separate examples of a live B-scan input 225/227 used to trained neural network 97, and their respectively output denoised B-scans 226/228. As is evident from FIGS. 20 and 21, and the present NN machine learning model provides significant noise removal.

Example Optical Coherence Tomography (OCT) Systems

Figure 22:
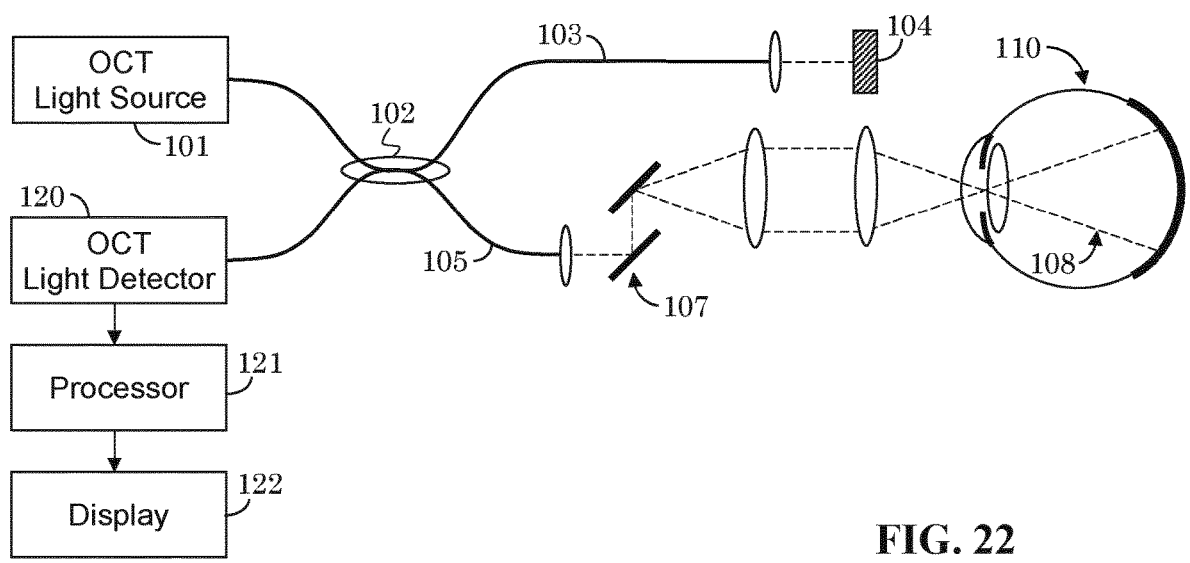
FIG. 22 illustrates a generalized frequency domain optical coherence tomography (FD-OCT) system used to collect 3-D image data of an eye suitable for use with the present invention.

A generalized frequency domain optical coherence tomography (FD-OCT) system used to collect 3-D image data of the eye suitable for use with the present invention is illustrated in FIG. 22. An FD-OCT system 100 includes a light source, 101. Typical light sources include, but are not limited to, broadband light sources with short temporal coherence lengths or swept laser sources. A beam of light from light source 101 is routed, typically by optical fiber 105, to illuminate a sample 110; a typical sample being tissues in the human eye. The light source 101 can be either a broadband light source with short temporal coherence length in the case of spectral domain OCT (SD-OCT) or a wavelength tunable laser source in the case of swept source OCT (SS-OCT). The light may be scanned, typically with a scanner 107 between the output of the optical fiber 105 and the sample 110, so that the beam of light (dashed line 108) is scanned laterally (in x and y) over the region of the sample to be imaged. In the case of a full-field OCT, no scanner is needed and the light is applied across the entire, desired field-of-view (FOV) at once. Light scattered from the sample is collected, typically into the same optical fiber 105 used to route the light for illumination. Reference light derived from the same source 101 travels a separate path, in this case involving optical fiber 103 and retro-reflector 104 with an adjustable optical delay. Those skilled in the art will recognize that a transmissive reference path can also be used and that the adjustable delay could be placed in the sample or reference arm of the interferometer. Collected sample light is combined with reference light, typically in a fiber coupler 102, to form light interference in an OCT light detector 120. Although a single fiber port is shown going to the detector 120, those skilled in the art will recognize that various designs of interferometers can be used for balanced or unbalanced detection of the interference signal. The output from the detector 120 is supplied to a processor 121 (e.g., computing device) that converts the observed interference into depth information of the sample. The depth information may be stored in a memory associated with the processor 121 and/or displayed on a display 122. The processing and storing functions may be localized within the OCT instrument or functions may be performed on an external processing unit (e.g., the computer system shown in FIG. 29) to which the collected data is transferred. This unit could be dedicated to data processing or perform other tasks which are quite general and not dedicated to the OCT device. The processor 121 may contain for example a field-programmable gate array (FPGA), a digital signal processor (DSP), an application specific integrated circuit (ASIC), a graphics processing unit (GPU), a system on chip (SoC), a central processing unit (CPU), a general purpose graphics processing unit (GPGPU), or a combination thereof, that performs some, or the entire data processing steps, prior to passing on to the host processor or in a parallelized fashion.

The sample and reference arms in the interferometer could consist of bulk-optics, fiber-optics, or hybrid bulk-optic systems and could have different architectures such as Michelson, Mach-Zehnder or common-path based designs as would be known by those skilled in the art. Light beam as used herein should be interpreted as any carefully directed light path. Instead of mechanically scanning the beam, a field of light can illuminate a one or two-dimensional area of the retina to generate the OCT data (see for example, U.S. Pat. No. 9,332,902; D. Hillmann et al, "Holoscopy—holographic optical coherence tomography" Optics Letters 36(13): 2390 2011; Y. Nakamura, et al, "High-Speed three dimensional human retinal imaging by line field spectral domain optical coherence tomography" Optics Express 15(12):7103 2007; Blazkiewicz et al, "Signal-to-noise ratio study of full-field Fourier-domain optical coherence tomography" Applied Optics 44(36):7722 (2005)). In time-domain systems, the reference arm needs to have a tunable optical delay to generate interference. Balanced detection systems are typically used in TD-OCT and SS-OCT systems, while spectrometers are used at the detection port for SD-OCT systems. The invention described herein could be applied to any type of OCT system. Various aspects of the invention could apply to any type of OCT system or other types of ophthalmic diagnostic systems and/or multiple ophthalmic diagnostic systems including but not limited to fundus imaging systems, visual field test devices, and scanning laser polarimeters.

In Fourier Domain optical coherence tomography (FD-OCT), each measurement is the real-valued spectral interferogram (Sj(k)). The real-valued spectral data typically goes through several post-processing steps including background subtraction, dispersion correction, etc. The Fourier transform of the processed interferogram, results in a complex valued OCT signal output $Aj(z)=|Aj|e^{i\varphi}$. The absolute value of this complex OCT signal, $|Aj|$, reveals the profile of scattering intensities at different path lengths, and therefore scattering as a function of depth (z-direction) in the sample. Similarly, the phase, $\varphi j$ can also be extracted from the complex valued OCT signal. The profile of scattering as a function of depth is called an axial scan (A-scan). A set of A-scans measured at neighboring locations in the sample produces a cross-sectional image (tomogram or B-scan) of the sample. A collection of B-scans collected at different transverse locations on the sample makes up a data volume or cube. For a particular volume of data, the term fast axis refers to the scan direction along a single B-scan whereas slow axis refers to the axis along which multiple B-scans are collected. The term "cluster scan" may refer to a single unit or block of data generated by repeated acquisitions at the same (or substantially the same) location (or region) for the purposes of analyzing motion contrast, which may be used to identify blood flow. A cluster scan can consist of multiple A-scans or B-scans collected with relatively short time separations at approximately the same location(s) on the sample. Since the scans in a cluster scan are of the same region, static structures remain relatively unchanged from scan to scan within the cluster scan, whereas motion contrast between the scans that meets predefined criteria may be identified as blood flow. A variety of ways to create B-scans are known in the art including but not limited to: along the horizontal or x-direction, along the vertical or y-direction, along the diagonal of x and y, or in a circular or spiral pattern. B-scans may be in the x-z dimensions but may be any cross sectional image that includes the z-dimension.

In OCT Angiography, or Functional OCT, analysis algorithms may be applied to OCT data collected at the same, or approximately the same, sample locations on a sample at different times (e.g., a cluster scan) to analyze motion or flow (see for example US Patent Publication Nos. 2005/0171438, 2012/0307014, 2010/0027857, 2012/0277579 and U.S. Pat. No. 6,549,801, all of which are hereby incorporated in their entirety by reference). An OCT system may use any one of a number of OCT angiography processing algorithms (e.g., motion contrast algorithms) to identify blood flow. For example, motion contrast algorithms can be applied to the intensity information derived from the image data (intensity-based algorithm), the phase information from the image data (phase-based algorithm), or the complex image data (complex-based algorithm). An en face image is a 2D projection of 3D OCT data (e.g., by averaging the intensity of each individual A-scan, such that each A-scan defines a pixel in the 2D projection). Similarly, an en face vasculature image is an image displaying motion contrast signal in which the data dimension corresponding to depth (e.g., z-direction along an A-scan) is displayed as a single representative value (e.g., a pixel in a 2D projection image), typically by summing or integrating all or an isolated portion of the data (see for example U.S. Pat. No. 7,301,644 hereby incorporated in its entirety by reference). OCT systems that provide an angiography imaging functionality may be termed OCT angiography (OCTA) systems.

Figure 23:
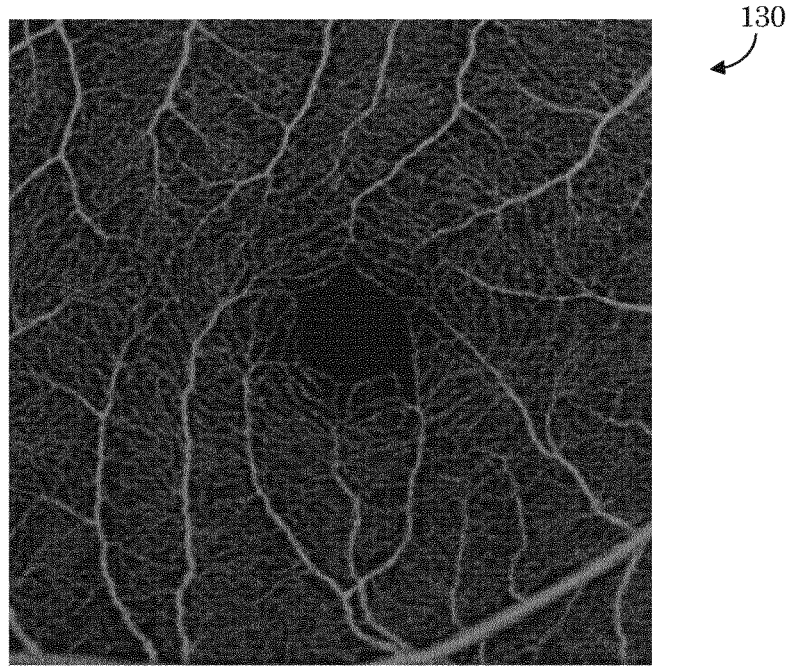
FIG. 23 shows an example of an en face vasculature image.

FIG. 23 shows an example of an en face vasculature image 130. After processing the data to highlight motion contrast using any of the motion contrast techniques known in the art, a range of pixels corresponding to a given tissue depth from the surface of internal limiting membrane (ILM) in retina, may be summed to generate the en face (e.g., frontal view) image 130 of the vasculature.

The OCT system discussed herein may provide 2D (i.e. cross-sectional) images, en-face images, 3D images, metrics related to a health condition, and the like. This system may be used with any other system. For example, the OCT system may be used with a surgical system or surgical microscope system for diagnostic or treatment purposes. The OCT system may be used to analyze any sample. For example, the OCT system may be used in analysis, e.g. formation of images, of any type of life forms and inanimate objects. Examples of life forms may be animals, plants, cells or the like.

Although OCT and OCTA can provide very good images, they may still be susceptible to image artifacts, which may affect the confidence with which a clinician views an image. For example, it is possible that a clinician may confuse an image artifact for a real, physical structure. Thus, image artifacts may introduce fictitious structures or obscure real physical structures, both of which may lower the diagnostic efficacy of an image. It is therefore beneficial to provide a method for improving the image quality of a collected scan image. One way to improve an image's quality and remove some image artifacts is to collect multiple (e.g., 4 to 10) images/scans of the same area of a specimen, identify common features in the collected images, register together (e.g., align) the collected images based on their identified common features, and average the registered images. Because real structure are likely to be present in similar locations in all collected images, while it is unlikely that the same image artifacts will be present at the same locations in all images, averaging the collected images has the effect of reducing the visibility of some image artifacts while reinforcing the presences of real structures. However, there are a few difficulties with this approach. For example, collecting a large number of images (e.g., 4 to 10), may significantly prolong the time required to acquire the necessary images, which introduces issues of patient comfort and potential error due to eye movements. Secondly, an increased probability of error may result in increased image artifacts, which may complicate the identifying and registering of common features in the collected images. That is, the more images one collects for averaging, the more difficult it is to obtain a good average image. These difficulties are compounded when attempting to average cluster images since each cluster image is comprised of multiple, individual scans.

Example Adaptive Optics-Optical Coherence Tomography (AO-OCT) System

Another approach toward generating an improved image (e.g., OCT or OCTA image) is to use adaptive optics. The optics of the eye and their alignment are not perfect, which result in light rays entering (or exiting) the eye deviating from a desired path. These deviations (e.g. optical aberrations) may blur images taken by an ophthalmic imaging system. Adaptive optics (AO) improve the performance of optical systems by reducing the effects of optical aberrations. For example, adaptive optics may be combined with an OCT/OCTA to form an AO-OCT system with improved image quality.

Figure 24:
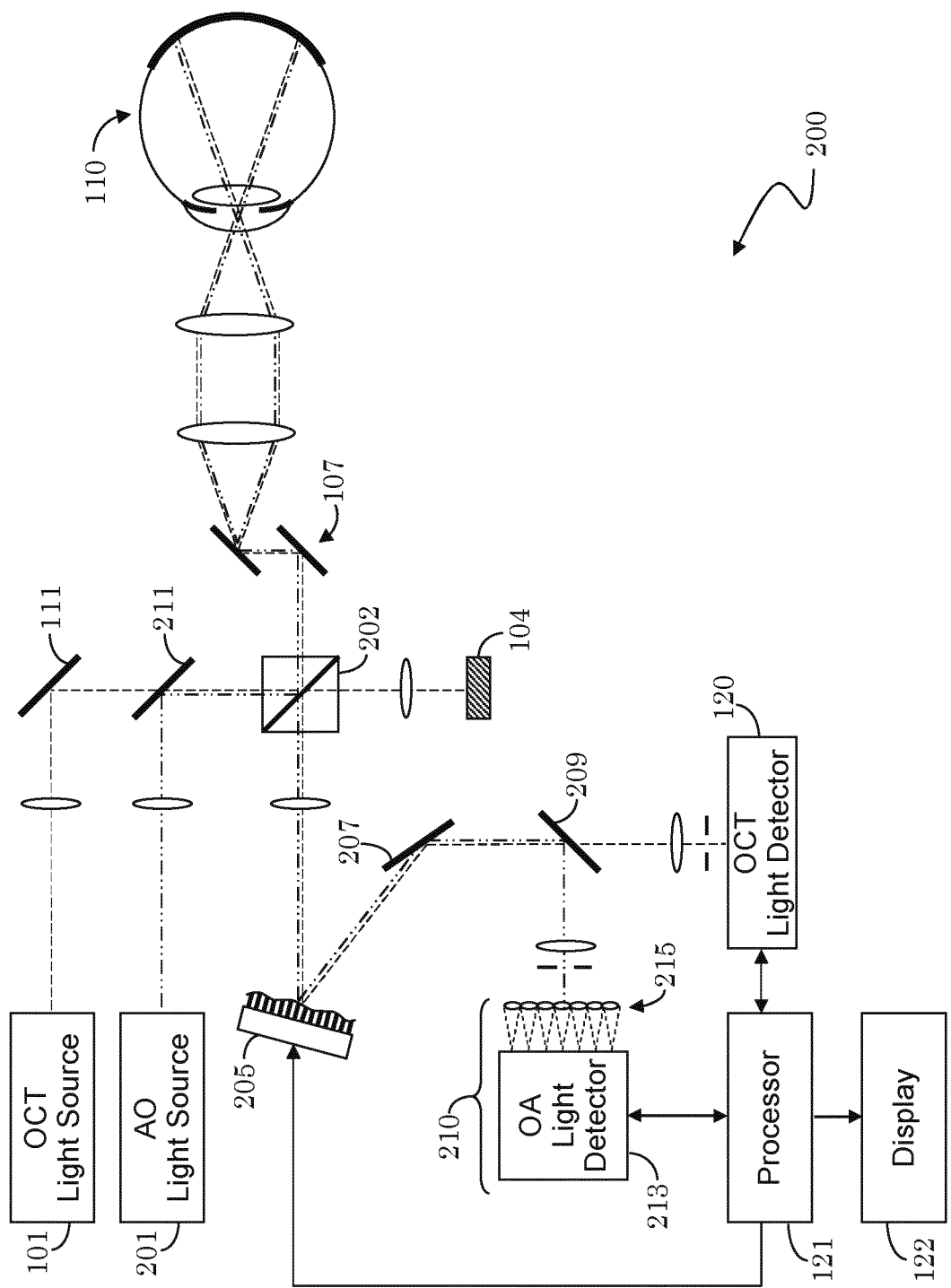
FIG. 24 illustrates a generalized adaptive optics optical coherence tomography (AO-OCT) system comprised of an AO subsystem and an OCT/OCTA subsystem.

FIG. 24 illustrates an exemplary AO-OCT system 200 comprised of an AO subsystem and an OCT/OCTA subsystem. All elements of the OCT/OCTA subsystem similar to those of FIG. 22 have similar reference numbers and are described above. In the present example, the OCT/OCTA subsystem includes OCT light source 101 whose light beam (illustrated as dash line) is folded by a reflector (e.g., mirror) 111 toward a beam splitter 202, which splits the light beam onto a reference arm including retro-reflector 104 and onto a sample arm including scanner 107 leading to a sample (e.g., eye) 110. In this manner the light beam from OCT light source 101 may be scanned laterally (in x and y) over a target region of the eye 101 to be imaged. Collected sample light returning from eye 101 is combined with reference light returning from retro-reflector 104 by beam splitter 202 to form light interference in OCT light detector 120, whose output is processed by processor 121 and converted into depth information. Like before, the depth information may be stored in a memory associated with the processor 121 and/or displayed on display 122.

The AO subsystem may have its own AO light source 201 (e.g., a laser or superluminescent diode, SLD), whose light beam (illustrated as a dash-dot-dot-dash line) is folded by reflector 211 onto the optical path of the OCT light source 101 toward beam splitter 202. Light from AO light source 201 follows the same optical path as that of the OCT subsystem from beam splitter 202 to the eye 110, where it is focused by the eye's optics to a point on the retina. If the eye were a perfect optical system, wavefronts reflected from the eye would be perfectly flat, but since the eye is not perfect, the returning wavefronts are not flat and tend to have optical aberrations, e.g., irregular curved shapes. Because the OA subsystem shares a common optical path with the OCT/OCTA subsystem, the AO subsystem can observe and correct for optical aberrations in the shared optical path before the OCT/OCTA subsystem scans the eye.

The returning AO light reflected from the eye travels through beam splitter 202 onto a wavefront corrector 205, such as a deformable mirror that is configurable to compensate for aberrations. The common optical path continues from wavefront corrector 205 toward beam splitter 209, as guided by a reflector 207. At beam splitter 209, the optical paths of the OCT/OCTA subsystem and AO subsystem diverge. Beam splitter 209 passes the collected sample light (from eye 110) and the reference light (from retro-reflector 104) to OCT light detector 120, and folds the returning AO light onto a wavefront sensor 210, which measures/monitors the optical aberrations from the eye 110. Wavefront sensor 210 may be comprised of a lenslet array 215 (e.g., an array of tiny lenses) and an AO light detector 213 (e.g., a photo detector).

Lenslet array 215 is at a conjugate plane of eye's pupil so that the wavefront shape at the lenslet plane matches that at the eye's pupil. The lenslet array produces an array of spot images on AO light detector 213 in accordance with the wavefront shape. Processor 121, or another computing system not shown, may function as a control system for the AO subsystem and examine the wavefront information from wavefront sensor 210 to determine a corrective configuration for wavefront corrector 205. For a perfect eye, lenslet array 215 would produce a perfectly regular array of spots on AO light detector 213, but optical aberrations distort and displace these spots. From the observed spot distortions and displacements, processor 121 can determine the shape of the wavefront emerging from the eye 110 and thereby determine a compensating shape for wavefront corrector 205 to correct for (e.g., reduce) the observed aberrations. That is, a wavefront from the eye 110 is received by wavefront sensor 210, which measures the eye's wave aberrations, and processor 121 sends control signals to the wavefront corrector 205 to configure its reflective surface into a shape calculated to compensate for the observed aberrations. The wavefront corrector 205, wavefront sensor 210, and processor 121 thus form a feedback system where observed optical aberrations are reduced with each feedback iteration (e.g., at least up to a diffraction limit). Once the observed optical aberrations have been sufficiently reduced (e.g. reduced to within a predefined threshold), the OCT/OCTA subsystem is activated and the eye is scanned (or imaged) with much improved resolution (e.g., lateral resolution).

In summary, the AO subsystem identifies and corrects for optical aberrations in the shared optical path, but does not provide a retinal imaging/scanning functionality. Rather, once the AO subsystem has corrected for optical aberrations in the shared optical path, the OCT/OCTA subsystem provides the retinal imaging/scanning functionality. The AO-OCT suffers from the added cost and complexity of the AO subsystem, but benefits from increased lateral resolution, reduced speckle size (granular artifacts), and increased sensitivity to weak reflections, which may result in improved visualization and detection of microscopic structures in the retina. Another disadvantage of an AO-OCT system is that due to the specialized optics of the AO subsystem, the size of the scans/image obtainable are much smaller than those obtainable with more conventional OCT/OCTA systems, as described above. In order to obtain AO-OCT images of comparable size as more conventional OCT/OCTA systems, multiple AO-OCT scans at different overlapping locations need to be captured and montaged together, which increases the total scan time. Furthermore, the time needed for the AO subsystem to observed and correct for optical aberrations increases the time requirement of an individual OCT/OCTA scan sequence. Consequently, AO-OCT systems are more complicated and slower than conventional OCT/OCTA systems, and have a very limited field-of-view, all of which have complicated the production of a commercially successful AO-OCT system.

Neural Networks

A neural network, or neural net, is a (nodal) network of interconnected neurons, where each neuron represents a node in the network. Groups of neurons may be arranged in layers, with the outputs of one layer feeding forward to a next layer in a multilayer perceptron (MLP) arrangement. MLP may be understood to be a feedforward neural network model that maps a set of input data onto a set of output data.

Figure 25:
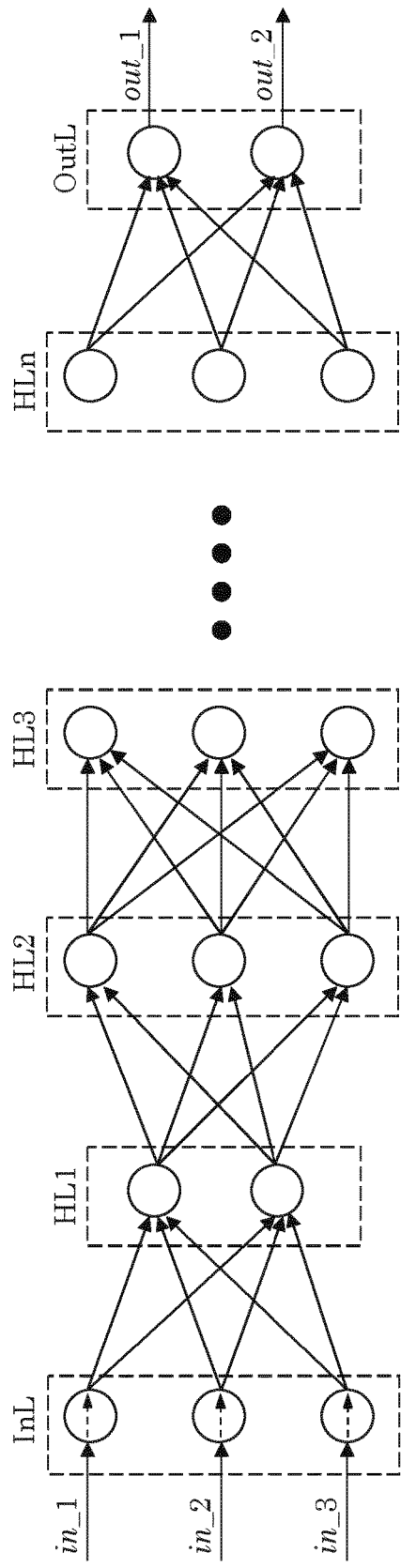
FIG. 25 illustrates an example of a multilayer perceptron (MLP) neural network.

FIG. 25 illustrates an example of a multilayer perceptron (MLP) neural network. Its structure may include multiple hidden (e.g., internal) layers HL1 to HLn that map an input layer InL (that receives a set of inputs (or vector input) in_1 to in_3) to an output layer OutL that produces a set of outputs (or vector output), e.g., out_1 and out_2. Each layer may have any given number of nodes, which are herein illustratively shown as circles within each layer. In the present example, the first hidden layer HL1 has two nodes, while hidden layers HL2, HL3, and HLn each have three nodes. Generally, the deeper the MLP (e.g., the greater the number of hidden layers in the MLP), the greater its capacity to learn. The input layer InL receives a vector input (illustratively shown as a three-dimensional vector consisting of in_1, in_2 and in_3), and may apply the received vector input to the first hidden layer HL1 in the sequence of hidden layers. An output layer OutL receives the output from the last hidden layer, e.g., HLn, in the multilayer model, processes its inputs, and produces a vector output result (illustratively shown as a two-dimensional vector consisting of out_1 and out_2).

Typically, each neuron (or node) produces a single output that is fed forward to neurons in the layer immediately following it. But each neuron in a hidden layer may receive multiple inputs, either from the input layer or from the outputs of neurons in an immediately preceding hidden layer. In general, each node may apply a function to its inputs to produce an output for that node. Nodes in hidden layers (e.g., learning layers) may apply the same function to their respective input(s) to produce their respective output(s). Some nodes, however, such as the nodes in the input layer InL receive only one input and may be passive, meaning that they simply relay the values of their single input to their output(s), e.g., they provide a copy of their input to their output(s), as illustratively shown by dotted arrows within the nodes of input layer InL.

Figure 26:
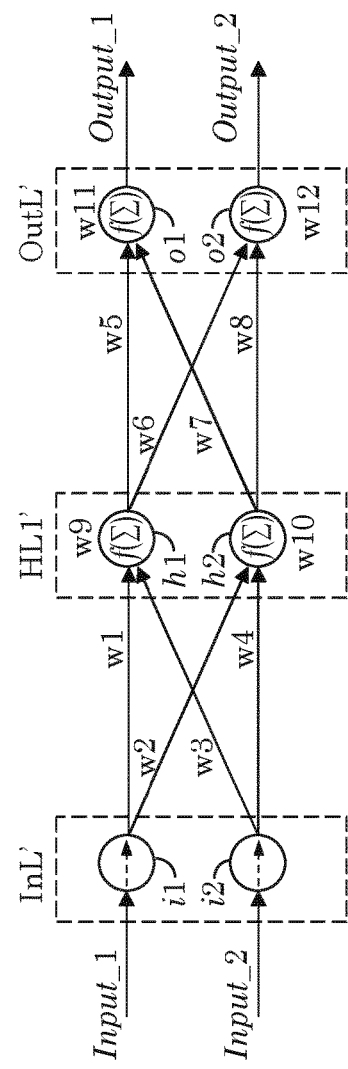
FIG. 26 shows a simplified neural network consisting of an input layer, a hidden layer, and an output layer.

For illustration purposes, FIG. 26 shows a simplified neural network consisting of an input layer InL', a hidden layer HL1', and an output layer OutL'. Input layer InL' is shown having two input nodes i1 and i2 that respectively receive inputs Input_1 and Input_2 (e.g. the input nodes of layer InL' receive an input vector of two dimensions). The input layer InL' feeds forward to one hidden layer HL1' having two nodes h1 and h2, which in turn feeds forward to an output layer OutL' of two nodes o1 and o2. Interconnections, or links, between neurons (illustrative shown as solid arrows) have weights w1 to w8. Typically, except for the input layer, a node (neuron) may receive as input the outputs of nodes in its immediately preceding layer. Each node may calculate its output by multiplying each of its inputs by each input's corresponding interconnection weight, summing the products of it inputs, adding (or multiplying by) a constant defined by another weight or bias that may be associated with that particular node (e.g., node weights (or biases) w9, w10, w11, w12 respectively corresponding to nodes h1, h2, o1, and o2), and then applying a non-linear function or logarithmic function to the result. The non-linear function may be termed an activation function or transfer function. Multiple activation functions are known in the art, and selection of a specific activation function is not critical to the present discussion. It is noted, however, that operation of the ML model, or behavior of the neural net, is dependent upon weight values, which may be learned so that the neural network provides a desired output for a given input.

The neural net learns (e.g., is trained to determine) appropriate weight values to achieve a desired output for a given input during a training, or learning, stage. Before the neural net is trained, each weight may be individually assigned an initial (e.g., random and optionally non-zero) value, e.g. a random-number seed. Various methods of assigning initial weights are known in the art. The weights are then trained (optimized) so that for a given training vector input, the neural network produces an output close to a desired (predetermined) training vector output. For example, the weights may be incrementally adjusted in thousands of iterative (training) cycles by a technique termed back-propagation. In each cycle of back-propagation, a training input (e.g., vector input or training input image/sample) is fed forward through the neural network to determine its actual output (e.g., vector output). An error (e.g., a training cycle error or loss error) for each output neuron, or output node, is then calculated based on the actual neuron output and a target training output for that neuron (e.g., a training output image/sample corresponding to the present training input image/sample). One then propagates back through the neural network (in a direction from the output layer back to the input layer) updating the weights based on how much effect each weight has on the overall error so that the output of the neural network moves closer to the desired training output. This cycle is then repeated until the actual output of the neural network is within an acceptable error range of the desired training output for the given training input. As it would be understood, each training input may require many back-propagation iterations before achieving a desired error range. Typically an epoch refers to one back-propagation iteration (e.g., one forward pass and one backward pass) of all the training samples, such that training a neural network may require many epochs. Generally, the larger the training set, the better the performance of the trained ML model, so various data augmentation methods may be used to increase the size of the training set. For example, when the training set includes pairs of corresponding training input images and training output images, the training images may be divided into multiple corresponding image segments (or patches). Corresponding patches from a training input image and training output image may be paired to define multiple training patch pairs from one input/output image pair, which enlarges the training set. Training on large training sets, however, places high demands on computing resources, e.g. memory and data processing resources. Computing demands may be reduced by dividing a large training set into multiple mini-batches, where the mini-batch size defines the number of training samples in one forward/backward pass. In this case, one epoch may include multiple mini-batches. Another issue is the possibility of a NN overfitting a training set such that the NN's capacity to generalize from a training input to a previously unseen live input is reduced. Issues of overfitting may be mitigated by creating an ensemble of neural networks or by randomly dropping out nodes within a neural network during training, which effectively removes the dropped nodes from the neural network. Various dropout regulation methods, such as inverse dropout, are known in the art.

It is noted that the operation of a trained NN machine model is not a straight-forward algorithm of operational/analyzing steps. Indeed, when a trained NN machine model receives an input, the input is not analyzed in the traditional sense. Rather, irrespective of the subject or nature of the input (e.g., a vector defining a live image/scan or a vector defining some other entity, such as a demographic description or a record of activity) the input will be subjected to the same predefined architectural construct of the trained neural network (e.g., the same nodal/layer arrangement, trained weight and bias values, predefined convolution/deconvolution operations, activation functions, pooling operations, etc.), and it may not be clear how the trained network's architectural construct produces its output. Furthermore, the values of the trained weights and biases are not deterministic and depend upon many factors, such as the amount of time the neural network is given for training (e.g., the number of epochs in training), the random starting values of the weights before training starts, the computer architecture of the machine on which the NN is trained, selection of training samples, distribution of the training samples among multiple mini-batches, choice of activation function(s), choice of error function(s) that modify the weights, and even if training is interrupted on one machine (e.g., having a first computer architecture) and completed on another machine (e.g., having a different computer architecture). The point is that the reasons why a trained ML model reaches certain outputs is not clear, and much research is currently ongoing to attempt to determine the factors on which a ML model bases its outputs. Therefore, the processing of a neural network on live data cannot be reduced to a simple algorithm of steps. Rather, its operation is dependent upon its training architecture, training sample sets, training sequence, and various circumstances in the training of the ML model.

In summary, construction of a NN machine learning model may include a learning (or training) stage and a classification (or operational) stage. In the learning stage, the neural network may be trained for a specific purpose and may be provided with a set of training examples, including training (sample) inputs and training (sample) outputs, and optionally including a set of validation examples to test the progress of the training. During this learning process, various weights associated with nodes and node-interconnections in the neural network are incrementally adjusted in order to reduce an error between an actual output of the neural network and the desired training output. In this manner, a multi-layer feed-forward neural network may be made capable of approximating any measurable function to any desired degree of accuracy. The result of the learning stage is a (neural network) machine learning (ML) model that has been learned (e.g., trained). In the operational stage, a set of test inputs (or live inputs) may be submitted to the learned (trained) ML model, which may apply what it has learned to produce an output prediction based on the test inputs.

Like the previously discussed neural networks, convolutional neural networks (CNN) are also made up of neurons that have learnable weights and biases. Each neuron receives inputs, performs an operation (e.g., dot product), and is optionally followed by a non-linearity. The CNN, however, may receive raw image pixels at one end (e.g., the input end) and provide classification (or class) scores at the other end (e.g., the output end). Because CNNs expect an image as input, they are optimized for working with volumes (e.g., pixel height and width of an image, plus the depth of the image, e.g., color depth such as an RGB depth defined of three colors: red, green, and blue). For example, the layers of a CNN may be optimized for neurons arranged in 3 dimensions. The neurons in a CNN layer may also be connected to a small region of the layer before it, instead of all of the neurons in a fully-connected NN. The final output layer of a CNN may reduce a full image into a single vector (classification) arranged along the depth dimension.

FIG. 27 provides an example convolutional neural network architecture. A convolutional neural network may be defined as a sequence of two or more layers (e.g., Layer 1 to Layer N), where a layer may include a (image) convolution step, a weighted sum (of results) step, and a non-linear function step. The convolution may be performed on the input data (e.g., input to a layer) by applying a filter (or kernel), e.g. on a moving window across the input data, to produce a feature map. Each layer and component of a layer may have different predetermined filters (from a filter bank), weights (or weighting parameters), and/or function parameters. The input data may be an image, which may be raw pixel values of the image, of a given pixel height and width. In the present example, the input image is illustrated as having a depth of three color channels RGB (Red, Green, and Blue). Optionally, the input image may undergo various preprocessing, and the preprocessing results may be input in place of, or in addition to, the raw input image. Some examples of image preprocessing may include: retina blood vessel map segmentation, color space conversion, adaptive histogram equalization, connected components generation, etc. Within a layer, a dot product may be computed between the given weights and a small region they are connected to in the input volume. Many ways of configuring a CNN are known in the art, but as an example, a layer may be configured to apply an elementwise activation function, such as max (0, x) thresholding at zero. A pooling function may be performed (e.g., along the x-y directions) to down-sample a volume.

This architecture has been found useful for image recognition and classification. For example, a fully-connected CNN (e.g., a CNN with fully connected layers) may be used to determine a classification output and produce a one-dimensional output vector providing weights indicative of the probability of specific classes of objects being present in the input image. However, for image segmentation, a one-dime national vector is not enough, and each classification output from the one-dimensional output vector needs to be mapped back to the original input image (e.g., on a pixel-by-pixel basis) to properly segment the input image into the identified classes. Since each CNN layers tends to reduce the resolution of the input image, to achieve image segmentation, one may add an additional stage to up-sample the image back to its original resolution. This may be achieved by application of a transpose convolution (or deconvolution) stage TC, which typically does not use any predefine interpolation method, and instead has learnable parameters. The TC is therefore learned along with the rest of the CNN during the training phase.

Convolutional Neural Networks have been successfully applied to many computer vision problems, but CNNs often have millions of free parameters to be trained, so large (ground truth) labelled datasets are typically required for training these networks. The U-Net architecture is based on CNNs and can generally be trained on a smaller training dataset than conventional CNNs.

Figure 28:
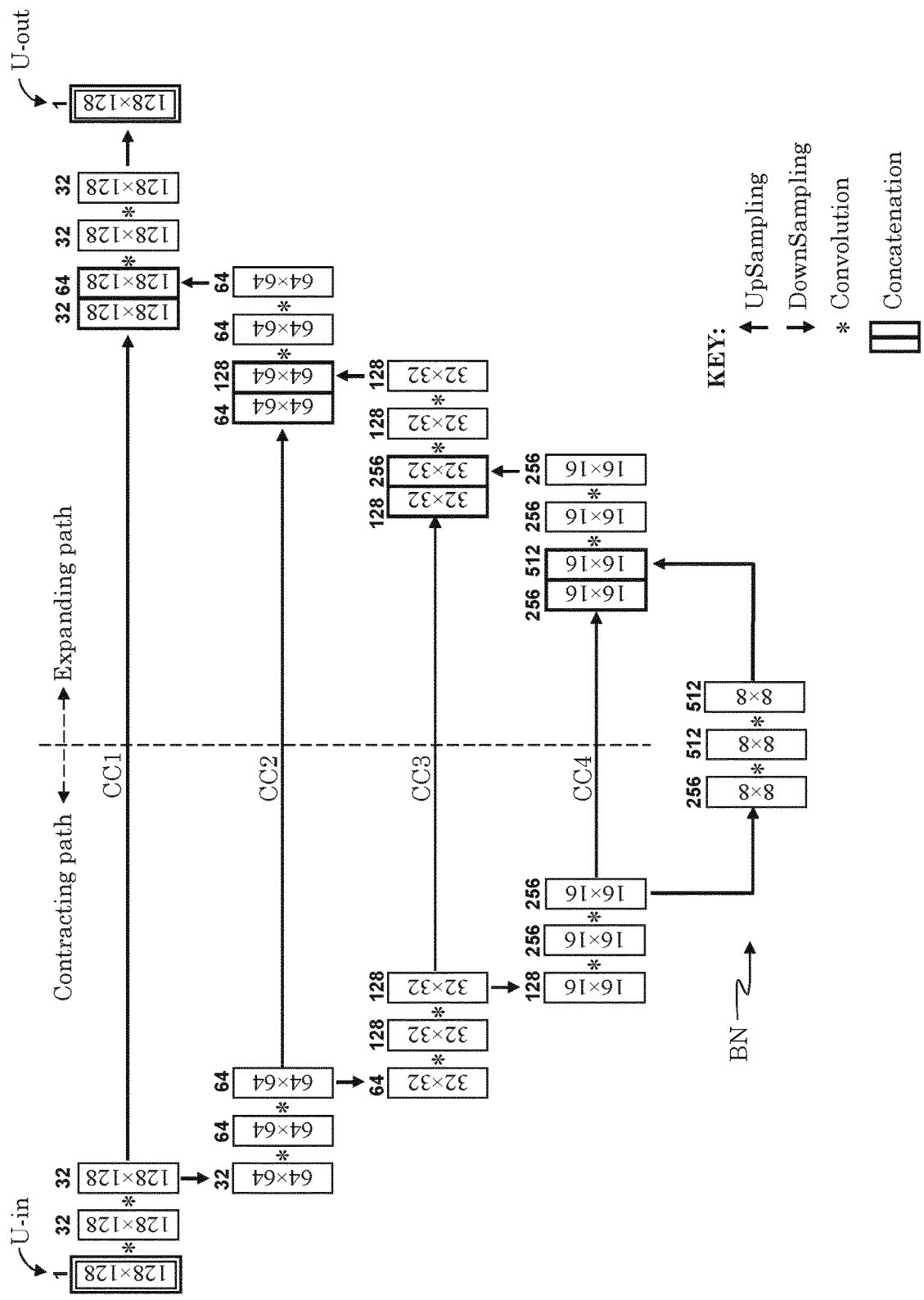
FIG. 28 illustrates an example U-Net architecture.

FIG. 28 illustrates an example U-Net architecture. The present exemplary U-Net includes an input module (or input layer or stage) that receives an input U-in (e.g., input image or image patch) of any given size (e.g., 128 by 128 pixels in size). The input image may be a fundus image, an OCT/OCTA en face, B-scan image, etc. It is to be understood that the input may be of any size and dimension. For example, the input image may be an RGB color image, a monochrome image, a volume scan, etc. The input image undergoes a series of processing layers, each of which is illustrated with exemplary sizes, but these sizes are illustration purposes only and would depend, for example, upon the size of the image, convolution filter, and/or pooling stages. The present architecture consists of a contracting path (herein illustratively comprised of four encoding modules) followed by an expanding path (herein illustratively comprised of four decoding modules), and four copy-and-crop links (e.g., CC1 to CC4) between corresponding modules/stages that copy the output of one encoding modules in the contracting path and concatenates it to the input of a correspond decoding module in the expanding path. This results in a characteristic U-shape, from which the architecture draws its name. The contracting path is similar to an encoder, and its basic function is to capture context via compact feature maps. In the present example, each encoding modules in the contracting path includes two convolutional neural network layers, which may be followed by one max pooling layer (e.g., DownSampling layer). For example, input image U-in undergoes two convolution layers, each producing 32 feature maps. The contracting path thus forms a convolutional network consisting of a plurality of encoding modules (or stages), each providing a convolution stage, followed by an activation function (e.g., a rectified linear unit, ReLU or sigmoid layer) and a max pooling operation. The expanding path is similar to a decoder, and its function is to provide localization and to retain spatial information despite the down sampling and any max-pooling performed in the contracting stage. In the contracting path, spatial information is reduced while feature information is increased. The expanding path includes a plurality of decoding modules, where each decoding module concatenates its current value with the output of a corresponding encoding module. That is, the feature and spatial information are combined in the expanding path through a sequence of up-convolutions (e.g., UpSampling or transpose convolutions or deconvolutions) and concatenations with high-resolution features from the contracting path (e.g., via CC1 to CC4). Thus, the output of a deconvolution layer is concatenated with the corresponding (optionally cropped) feature map from the contracting path, followed by two convolutional layers and an activation function (with optional batch normalization). The output from the last module in the expanding path may be fed to another processing/training block or layer (not shown), such as a classifier block, that may be trained along with the U-Net architecture. The module/stage (BN) between the contracting path and the expanding path may be termed the "bottleneck," and it may consist of two convolutional layers (with batch normalization and optional dropout).

Computing Device/System

Figure 29:
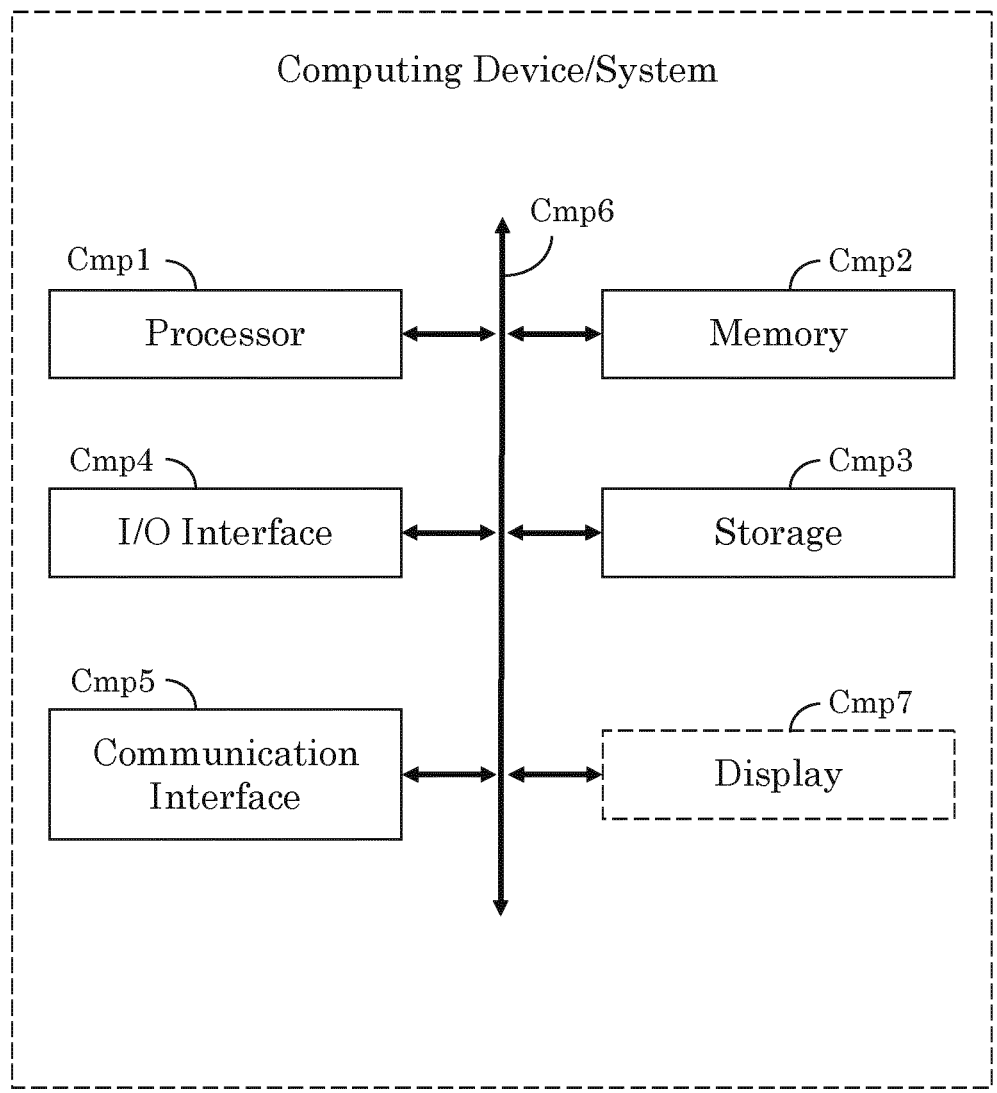
FIG. 29 illustrates an example computer system (or computing device or computer device).

FIG. 29 illustrates an example computer system (or computing device or computer device). In some embodiments, one or more computer systems may provide the functionality described or illustrated herein and/or perform one or more steps of one or more methods described or illustrated herein. The computer system may take any suitable physical form. For example, the computer system may be an embedded computer system, a system-on-chip (SOC), a single-board computer system (SBC) (such as, for example, a computer-on-module (COM) or system-on-module (SOM)), a desktop computer system, a laptop or notebook computer system, a mesh of computer systems, a mobile telephone, a personal digital assistant (PDA), a server, a tablet computer system, an augmented/virtual reality device, or a combination of two or more of these. Where appropriate, the computer system may reside in a cloud, which may include one or more cloud components in one or more networks.

In some embodiments, the computer system may include a processor Cmp1, memory Cmp2, storage Cmp3, an input/output (I/O) interface Cmp4, a communication interface Cmp5, and a bus Cmp6. The computer system may optionally also include a display Cmp7, such as a computer monitor or screen.

Processor Cmp1 includes hardware for executing instructions, such as those making up a computer program. For example, processor Cmp1 may be a central processing unit (CPU) or a general-purpose computing on graphics processing unit (GPGPU). Processor Cmp1 may retrieve (or fetch) the instructions from an internal register, an internal cache, memory Cmp2, or storage Cmp3, decode and execute the instructions, and write one or more results to an internal register, an internal cache, memory Cmp2, or storage Cmp3. In particular embodiments, processor Cmp1 may include one or more internal caches for data, instructions, or addresses. Processor Cmp1 may include one or more instruction caches, one or more data caches, such as to hold data tables. Instructions in the instruction caches may be copies of instructions in memory Cmp2 or storage Cmp3, and the instruction caches may speed up retrieval of those instructions by processor Cmp1. Processor Cmp1 may include any suitable number internal registers, and may include one or more arithmetic logic units (ALUs). Processor Cmp1 may be a multi-core processor; or include one or more processors Cmp1. Although this disclosure describes and illustrates a particular processor, this disclosure contemplates any suitable processor.

Memory Cmp2 may include main memory for storing instructions for processor Cmp1 to execute or to hold interim data during processing. For example, the computer system may load instructions or data (e.g., data tables) from storage Cmp3 or from another source (such as another computer system) to memory Cmp2. Processor Cmp1 may load the instructions and data from memory Cmp2 to one or more internal register or internal cache. To execute the instructions, processor Cmp1 may retrieve and decode the instructions from the internal register or internal cache. During or after execution of the instructions, processor Cmp1 may write one or more results (which may be intermediate or final results) to the internal register, internal cache, memory Cmp2 or storage Cmp3. Bus Cmp6 may include one or more memory buses (which may each include an address bus and a data bus) and may couple processor Cmp1 to memory Cmp2 and/or storage Cmp3. Optionally, one or more memory management unit (MMU) facilitate data transfers between processor Cmp1 and memory Cmp2. Memory Cmp2 (which may be fast, volatile memory) may include random access memory (RAM), such as dynamic RAM (DRAM) or static RAM (SRAM). Storage Cmp3 may include long-term or mass storage for data or instructions. Storage Cmp3 may be internal or external to computer system, and include one or more of a disk drive (e.g., hard disk drive, HDD, or solid state drive, SSD), flash memory, ROM, EPROM, optical disc, a magneto-optical disc, magnetic tape, Universal Serial Bus (USB)-accessible drive, or other type of non-volatile memory.

I/O interface Cmp4 may be software, hardware, or a combination of both, and include one or more interfaces (e.g., serial or parallel communication ports) for communication with I/O devices, which may enable communication with a person (e.g., user). For example, I/O devices may include a keyboard, keypad, microphone, monitor, mouse, printer, scanner, speaker, still camera, stylus, tablet, touch screen, trackball, video camera, another suitable I/O device or a combination of two or more of these.

Communication interface Cmp5 may provide network interfaces for communication with other systems or networks. Communication interface Cmp5 may include a Bluetooth interface or other type of packet-based communication. For example, communication interface Cmp5 may include a network interface controller (NIC) and/or a wireless NIC or a wireless adapter for communicating with a wireless network. Communication interface Cmp5 may provide communication with a WI-FI network, an ad hoc network, a personal area network (PAN), a wireless PAN (e.g., a Bluetooth WPAN), a local area network (LAN), a wide area network (WAN), a metropolitan area network (MAN), a cellular telephone network (such as, for example, a Global System for Mobile Communications (GSM) network), the Internet, or a combination of two or more of these.

Bus Cmp6 may provide a communication link between the above mentioned components of the computing system. For example, bus Cmp6 may include an Accelerated Graphics Port (AGP) or other graphics bus, an Enhanced Industry Standard Architecture (EISA) bus, a front-side bus (FSB), a HyperTransport (HT) interconnect, an Industry Standard Architecture (ISA) bus, an InfiniBand bus, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or other suitable bus or a combination of two or more of these.

Although this disclosure describes and illustrates a particular computer system having a particular number of particular components in a particular arrangement, this disclosure contemplates any suitable computer system having any suitable number of any suitable components in any suitable arrangement.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

While the invention has been described in conjunction with several specific embodiments, it is evident to those skilled in the art that many further alternatives, modifications, and variations will be apparent in light of the foregoing description. Thus, the invention described herein is intended to embrace all such alternatives, modifications, applications and variations as may fall within the spirit and scope of the appended claims.

The invention claimed is:

1. An optical coherence tomography (OCT) system comprising:
   a light source for generating a beam of light;
   a beam splitter having a beam-splitting surface for directing a first portion of the light into a reference arm and a second portion of the light into a sample arm;
   optics for directing the light in the sample arm to one or more locations on a sample;
   a detector for receiving light returning from the sample and reference arms and generating signals in response thereto;
   a processor for converting the signals into a first image and submitting the first image to an image translation module that translates the first image to a second image characterized by one or more of decreased noise artifacts, jitter and minimized creation of fictional structures as compared to the first image; and
   an output display for displaying a system output image based on the second image;
   wherein the image translation module includes a machine learning module based on a neural network trained using a set of training input images and a target set of training output images,
   wherein the neural network has an input module configured to receive a current training input image, a plurality of intermediate processing modules following the input module, an intermediate error module that determines an intermediate error based on an output of at least one select intermediate processing module and a current training output image, and an output module following the plurality of intermediate processing modules that determines a preliminary output error based on its output and the current training output image, and wherein a total loss error for a current training cycle is defined based on a combination of the preliminary output error and the intermediate error.

2. The system of claim 1, wherein the processor further combines a current second image with one or more previously obtained second images to generate the system output image.

3. The system of claim 2, wherein the current second image is combined with the one or more previously obtained second images by one of direct averaging or weighted averaging with second images of higher image quality being weighted more heavily.

4. The system of claim 1, wherein:
   the processor defines a plurality of the first images, submits the plurality first images to the image translation module to produce a corresponding plurality of second images, and calculates motion contrast information from the plurality of second images using an OCT angiography (OCTA) processing technique; and
   the system output image displays the motion contrast information.

5. The system of claim 1, wherein the processor:
   defines a plurality of the first images;
   submits the plurality of first images to the image translation module to produce a corresponding plurality of second images;
   applies an image registration technique to the plurality of second images to produce image alignment settings; and
   aligns the plurality of first images based at least in part on the image alignment settings of the plurality of second images.

6. The system of claim 1, wherein:
   the first image is divided into a plurality of first image segments; and
   the image translation module individually translates each first image segment into a corresponding second image segment, and combines the second image segments to construct the second image.

7. The system of claim 1, wherein:
   at least one of the training output images is defined as the averaging of a set of OCT test images of the same region of a test sample; and
   at least a fraction of the training input images is included in the set of OCT test images.

8. The system of claim 1, wherein:
   the first image is of a first region of the sample; and
   the second image has characteristics defined as the averaging of multiple hypothetical OCT scans of the first region with the first image.

9. The system of claim 1, wherein the training of the neural network includes:
   collecting a plurality of OCT test images of a target ophthalmic region;
   averaging the plurality of OCT test images to define a corresponding averaged-image of the target ophthalmic region;
   separately and individually inputting the OCT test images of the target ophthalmic region as training input images to the neural network, and providing their corresponding averaged-image as their individually corresponding training output image for the neural network.

10. The system of claim 9, wherein the training of the neural network further includes:
   dividing each OCT test image into a plurality of test segments;

dividing their corresponding averaged-image into a plurality of corresponding ground truth segments;
correlating test segments to corresponding ground truth segments;
separately and individually submitting the correlated test segments to the neural network as training input images and providing their correlated ground truth segments as training output images for the neural network.

11. The system of claim 9, further including combining a currently inputted OCT test image with a corresponding current output of the neural network to define a combination network output, and comparing the combination network output with the corresponding training output image to determine the total loss error for a current training cycle.

12. The system of claim 1, wherein the training input images and training output images include a mixture of images of healthy eyes and images of diseased eyes.

13. The system of claim 1, wherein:
the first image is of a first imaging modality; and
the second image simulates a second imaging modality different than the first imaging modality.

14. The system of claim 13, wherein the first and second modalities are a mixture including one or more of time domain OCT, spectral domain OCT, swept source OCT, and adaptive optics OCT (AO-OCT).

15. The system of claim 1, wherein:
the OCT system is of a first modality;
the machine learning module is trained using third images taken with a first OCT device of the first modality as the set of training input images and fourth images taken with a second OCT device of a second modality as the target set of training output images, the second modality being different than the first modality; and
the second image has features characteristic of an image generated by an OCT system of the second modality.

16. The system of claim 15, wherein:
the first OCT device of the first modality is of a non-adaptive optics OCT type;
the second OCT device of the second modality is of an adaptive optics OCT type;
the third images obtained by the first OCT device are bigger than the fourth images obtained by the second OCT device, the third images are divided into third image segments of similar size as the fourth images and each third image segment is correlated to a corresponding fourth image; and
the correlated third segments are separately and individually submitted to the neural network as training input images and their correspondingly correlated fourth images are provided as training output images for the neural network.

17. The system of claim 1, wherein
the plurality of intermediate processing modules form a contracting path and an expanding path, the contracting path following the input module and including a plurality of encoding modules, each encoding module having a convolution stage, an activation function, and a max pooling operation,
the expanding path following the contracting path and having a plurality of decoding modules, each decoding module concatenates its current value with that of a corresponding encoding module;
the output module is an output convolution module excluding a pooling layer and a sigmoid layer activation function, the output convolution module receiving the output from the last decoding module in the expanding path and producing the preliminary output error; and
the intermediate error module determines the intermediate error for at least one encoding module and/or one decoding module.

18. The system of claim 17, wherein during training of the neural network:
the intermediate error module determines the error measure as an error between the current training output image and the current value of the intermediate error module's corresponding encoding module and/or decoding module; and
the preliminary output error from the output convolution module is based on the current training output image and the current value of the output convolution module.

19. An ophthalmic imaging system comprising:
a processor for acquiring a first image, and submitting the first image to an image modification module that defines a second image based on the first image; and
an output display for displaying an output image based on the second image;
wherein the image modification module includes a machine model based on a neural network trained using a set of training input images and a target set of training output images, the neural network having:
a) an input module for receiving a current training input image;
b) a contracting path following the input module, the contracting path including a plurality of encoding modules, each encoding module having a convolution stage, an activation function, and a max pooling operation;
c) an expanding path following the contracting path, the expanding path having a plurality of decoding modules, each decoding module concatenating its current value with that of a corresponding encoding module;
d) an output convolution module excluding a pooling layer and an activation function, the output convolution module receiving the output from the last decoding module in the expanding path and producing a preliminary output error; and
e) an intermediate error module that determines an error measure for at least one encoding module and/or one decoding module; and
during training of the neural network, the preliminary output error of the output convolution module is combined with the output error of the intermediate error module.

20. The system of claim 19, wherein the activation function is a rectifier linear unit or sigmoid layer.

21. The system of claim 19, wherein the preliminary output error is based on a current training output image and the error measure is based on a current output of the at least one encoding module and/or one decoding module and the current training output image.

22. The system of claim 21, wherein
a training cycle error for a current training cycle is based on the combined errors from the output convolution module and the intermediate error module.

23. The system of claim 19, wherein the error measure is based on a square loss function.

24. The system of claim 19, wherein the ophthalmic imaging system is an optical coherence tomography (OCT) angiography system, and the first image is a vasculature image.

25. The system of claim 19, wherein the ophthalmic imaging system is an optical coherence tomography (OCT) system of a first modality, and training of the neural network includes:
- collecting one or more of third images of different target ophthalmic regions using a first OCT system of the first modality;
- collecting one or more of fourth images of the same target ophthalmic regions using a second OCT system of a second modality different than the first modality;
- defining one or more of the training output images from the one or more fourth images; and
- defining one or more of the training input images from the one or more third images, wherein each input training image has a corresponding training output image.

26. The system of claim 25, wherein:
the first OCT system of a non-adaptive optics OCT type; and
the second OCT system is of an adaptive optics OCT type.

27. The system of claim 19, wherein one of the set of training input images or target set of training output images are obtained by an optical coherence tomography (OCT) system, and the other of the set of training input images or target set of training output images are obtained by a fundus imaging system.

* * * * *